(12) United States Patent
Arcese et al.

(10) Patent No.: US 7,729,289 B2
(45) Date of Patent: Jun. 1, 2010

(54) METHOD, SYSTEM AND COMPUTER PROGRAM PRODUCT FOR ROUTING INFORMATION ACROSS FIREWALLS

(75) Inventors: Mauro Arcese, Fontana Liri (IT); Giuseppe Ciano, Rome (IT); Alessandro Donatelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 11/744,973

(22) Filed: May 7, 2007

(65) Prior Publication Data
US 2008/0049643 A1 Feb. 28, 2008

(30) Foreign Application Priority Data
May 11, 2006 (EP) ................................... 06113801

(51) Int. Cl.
H04L 12/28 (2006.01)
(52) U.S. Cl. .................. 370/254; 370/395.31; 370/400; 370/401; 370/432; 709/238; 709/240; 709/242
(58) Field of Classification Search .................. 370/254, 370/395.31, 392, 400, 401, 399, 432, 238, 370/389; 709/238, 240, 242
See application file for complete search history.

(56) References Cited

U.S. PATENT DOCUMENTS

| | | | |
|---|---|---|---|
| 7,457,248 B1 * | 11/2008 | Ali et al. | 370/235 |
| 2003/0123483 A1 * | 7/2003 | Donatelli et al. | 370/469 |
| 2006/0159082 A1 * | 7/2006 | Cook et al. | 370/389 |
| 2006/0193333 A1 * | 8/2006 | Baughan et al. | 370/400 |
| 2008/0162723 A1 * | 7/2008 | Zhao et al. | 709/242 |

* cited by examiner

Primary Examiner—Pankaj Kumar
Assistant Examiner—Anez Ebrahim
(74) Attorney, Agent, or Firm—Jordan Law LLC

(57) ABSTRACT

For routing information in a network across firewalls, virtual sessions between two remote nodes are implemented by means of multiple point-to-point sessions between pairs of adjacent nodes connected through a tunnel crossing the corresponding firewall. Each node stores a routing table that is used to pass the information to be provided to a desired target node to the correct adjacent node. A peer-to-peer communication scheme is supported for allowing each pair of nodes to exchange information. For this purpose, a specific algorithm is proposed for propagating the routing information dynamically among the nodes of the network, with rules that prevent the generation of any propagation cycle.

12 Claims, 22 Drawing Sheets

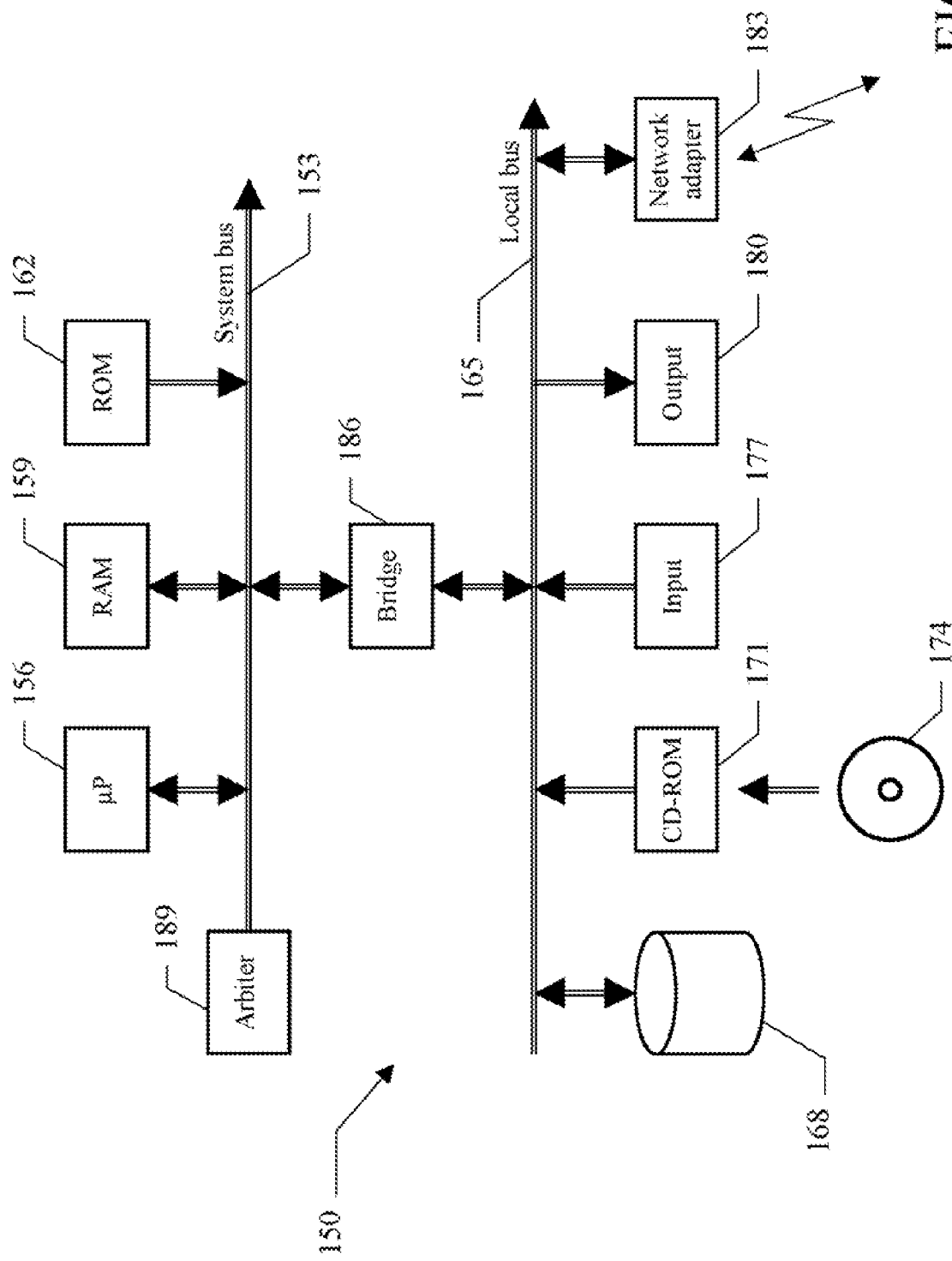

METHOD, SYSTEM AND COMPUTER PROGRAM PRODUCT FOR ROUTING INFORMATION ACROSS FIREWALLS

FIELD OF THE INVENTION

The present invention relates to the information technology field. More specifically, the invention relates to the routing of information in a network.

BACKGROUND

Computer networks have become increasingly popular in the last years. Typically, every organization has its own private network, (for example, a LAN); the private network consists of multiple computers, which are connected to each other for implementing desired services within the organization.

On the other hand, the private network must be exposed to a public network (typically, the Internet) to allow communication with the outside; in this way, the organization can provide its services to third parties or it can exploit services offered by others. The above-described integration allows conducting business everywhere in the world (thanks to the ubiquity of the Internet); therefore, this has become a need for facing the challenges of the market globalization.

However, several security issues are raised by the attachment of the (secure) private network of the organization to the largely uncontrolled environment of the Internet. Particularly, the organization must be protected from intruders attempting to gain unauthorized access to the private network or attempting to compromise its operation.

For this purpose, a firewall is typically used to control the traffic between the Internet and the private network. In order to increase the security of the environment, the private network may also be connected to the Internet through an extension thereof, known as Demilitarized Zone (DMZ). The DMZ includes all the computers (such as web servers) that must be publicly accessible from the Internet. A first firewall separates the DMZ from the Internet, and a second firewall separates the private network from the DMZ. In this way, the web servers are protected from the Internet and they are taken apart from the private network at the same time. Preferably, multiple security compartments (each one protected from the others by corresponding firewalls) are provided; in this way, any security breach in one of the compartments is restricted within the attacked compartment and it does lead to a total compromise of the environment.

Communication between computers separated by multiple firewalls (for example, located in two different compartments) is quite complex. This drawback is particularly acute when different protocols or technologies are used for the firewalls.

A solution known in the art is described in US-A-20030123483 and US-A-2003126230 (the entire disclosures of which are herein incorporated by reference). Particularly, those documents propose a specific communication stack for establishing virtual sessions between pairs of (remote) computers; each virtual session is implemented by means of multiple point-to-point sessions between adjacent computers, which are connected to each other through a tunnel crossing the corresponding firewall.

For this purpose, the computers are logically organized in a tree. Each computer (representing a node of the tree) stores a routing table, which specifies all the child nodes depending thereon in the tree. The routing table is used to pass information—to be provided to a target node—to the correct child node in the tree (until the desired destination is reached).

The routing tables of the network are created dynamically. Particularly, whenever a node turns-on it collects the routing tables from all the corresponding child nodes and updates its routing table accordingly. The routing table so obtained is then transmitted to the corresponding parent node in the tree, which updates its routing table and propagates the information along the tree up to a root node.

The above-described solution allows the root node to communicate with each leaf node of the tree in a secure manner.

However, this technique is restricted to applications having a hierarchical structure. Therefore, it is not possible to apply the same solution to generic applications; particularly, the above-described solution does not allow communications between whatever pair of computers in peer-to-peer applications.

SUMMARY

In its general form, the present invention is based on a solution for propagating the routing information automatically. Particularly, the present invention provides a solution as set out in the independent claims. Advantageous embodiments of the invention are described in the dependent claims.

More specifically, an aspect of the invention proposes a method for routing information in a network of data processing nodes (i.e., relays); each node is adapted to route the information according to a corresponding routing table, which includes an indication of the nodes reachable through each adjacent one of the nodes directly connected thereto. The method includes the following steps. At the beginning, a first one of the nodes submits a first request of addition of the nodes in the corresponding routing table to a second one of the adjacent nodes (full update command). The second node adds the nodes of the first request to the corresponding routing table, and then submits a second request to each adjacent node (add command). The second request for the first node relates to the addition of the nodes in the routing table of the second node with the exception of the nodes reachable through the first node; conversely, the second request for each other adjacent node (different from the first node) relates to the addition of the nodes that were added to the routing table of the second node. Each receiver one of the nodes (which receives the second request from a sender one of the adjacent nodes) adds the nodes of the second request to the corresponding routing table; the second request for the addition of the nodes that were added to the routing table of the receiver node is then propagated to each adjacent node different from the sender node.

Typically, the full update command is submitted in response to the establishment of a new connection between the first node and the second node.

In an embodiment of the invention, two different commands are used for the full update and the add requests. In this case, it is also possible to submit the full update command in response to a reset of the first node. Moreover, a third request of removal of the nodes in the corresponding routing table (remove command) is submitted from a fourth node to one or more of its adjacent nodes and it is then propagated in a similar way. For example, the remove command is submitted (to the other node associated in a selected connection) in response to the decision of dropping the selected connection. As a further example, the same remove command is submitted (to each adjacent node) in response to the decision of shutting down a selected node. Typically, the nodes are separated by firewalls; each pair of adjacent nodes is then connected through a point-to-point tunnel crossing the corresponding firewall.

Another aspect of the invention proposes a computer program for performing the method. A further aspect of the invention proposes a corresponding system.

BRIEF DESCRIPTION OF THE DRAWINGS

The invention itself, as well as further features and the advantages thereof, will be best understood with reference to the following detailed description, given purely by way of a nonrestrictive indication, to be read in conjunction with the accompanying drawings, in which:

FIG. 1c is a schematic block diagram of an exemplary computer of the system;

DETAILED DESCRIPTION

Figure 1A:
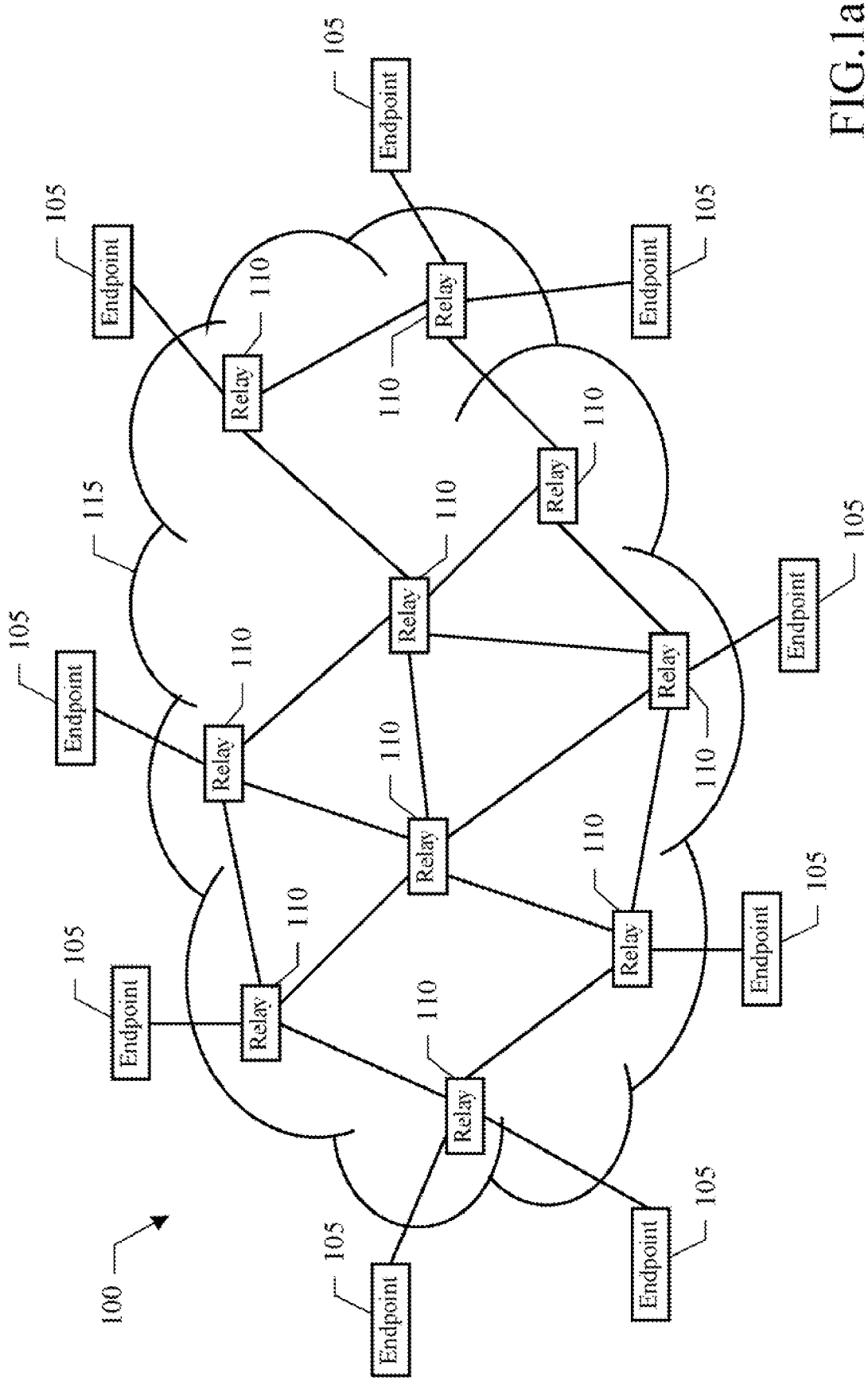
FIG. 1a is an abstract representation of a data processing system in which the solution according to an embodiment of the invention is applicable.

With reference in particular to FIG. 1a, a data processing system 100 with distributed architecture is illustrated. The system 100 includes multiple endpoints 105 (such as clients and servers), which communicate among them according to a peer-to-peer scheme. The communication must be implemented in a secure way over a non-protected structure; a typical example of this structure is based on the Internet, which is implemented by means of public media whose access is open and uncontrolled.

For this purpose, each endpoint 105 communicates with one or more associated trusted relays 110. In turn, each relay 110 can only communicate with one or more adjacent relays 110. The relays 110 are directly coupled to each other so as to define a network 115 that is virtually secure.

Figure 1B:
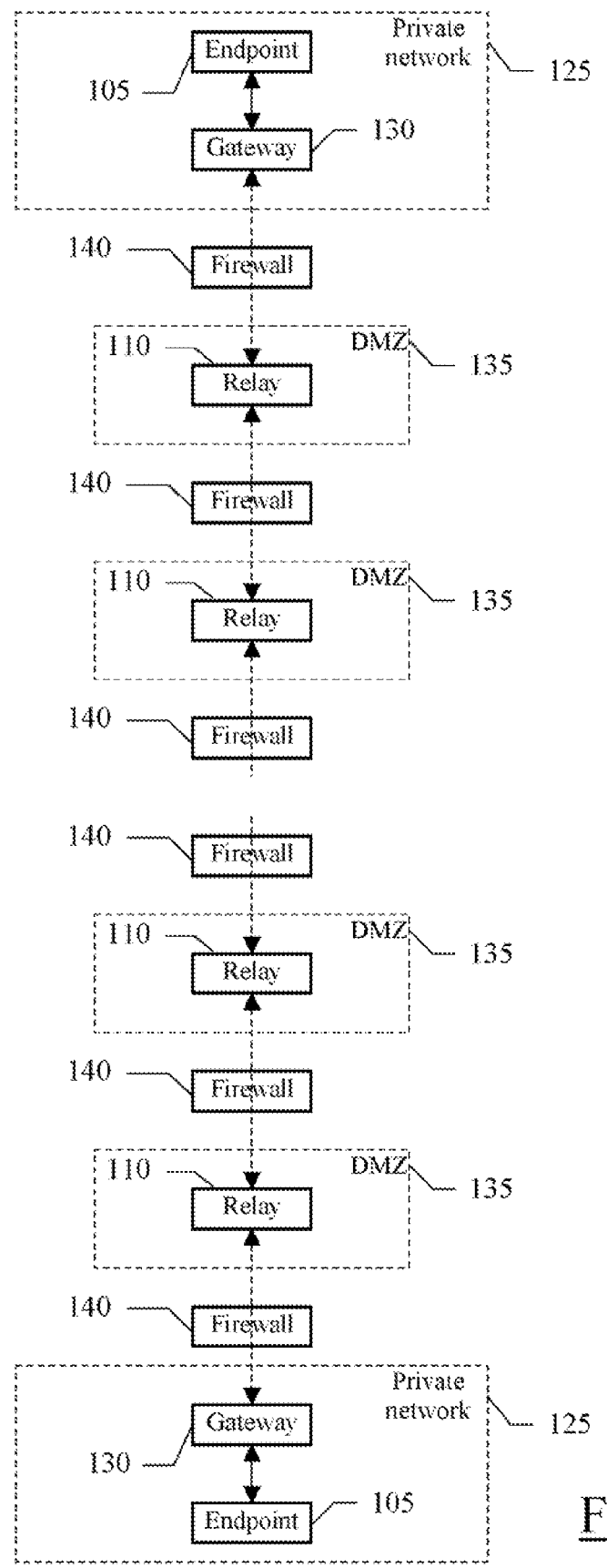
FIG. 1b shows the main functional blocks of this data processing system.

More specifically, as shown in FIG. 1b, each endpoint 105 is arranged within a private network 125; the private network 125 consists of a protected structure, which is implemented by means of communications lines whose access is closed and controlled. The endpoints 105 of the private network 125 are clustered around one or more gateways 130; each gateway 130 acts as a proxy, which manages all the communications of the associated endpoints 105 with the outside of the private network 125.

For this purpose, the gateway 130 is connected to a separate compartment (or DMZ) 135; the DMZ 135 includes the associated relay 110, which is exposed to the outside world. As a result, the DMZ 135 extends the private network 125 in such a way that all the communications with the private network 125 must pass through it; the DMZ 135 then implements a line of defense of the private network 125 preventing its direct access from the outside (so as to avoid exposing it to possible attacks), in order to increase the security of the system, the private networks 125 are preferably protected by two of more levels of DMZs 135, which are connected to each other so as to implement the above-described (virtually secure) network; in this way, any security breach in one of the DMZs 135 is restricted within the attacked compartment and it does lead to a total compromise of the system.

The private networks 125 and the DMZs 135 are protected by corresponding firewalls 140. Each firewall 140 is a hardware and/or software system that is installed at a point where two environments with different levels of security meet (also known as choke point), and that enforces a security policy between them; in this way, the firewall 140 can protect the more secure environment from attacks coming from the less secure environment. Particularly, each packet entering or leaving the more secure network pass through the firewall 140 that examines and blocks the packet when it does not meet desired security requirements. Moreover, the firewall 140 controls a connection policy between the two environments, which defines the way in which each connection is initiated; particularly, the connection may be bi-directional (when it can be initiated by both sides) or unidirectional (when it can be initiated by one side only, typically consisting of the more secure environment so as to ensure that the initiator of the connection is always trusted), in the system at issue, a firewall 140 separates each private network 125 from the associated DMZ 135 (implementing unidirectional connections that can be initiated by the gateway 130 only), and another firewall 140 separates each pair of DMZs 135 (implementing bi-directional connections).

Each relay 110 is directly connected to the associated gateway 125 and/or to each adjacent relay 110 by means of a pass-through communication tunnel, which crosses the corresponding firewall 140 with a point-to-point connection establishing a transparent pipe between them; security of the tunnel is ensured by mutual authentication of the involved entities at its ends.

Considering now FIG. 1c, a generic computer of the above-described system (endpoint relay, gateway and firewall) is denoted with 150. The computer 150 is formed by several units that are connected in parallel to a system bus 153 (with a structure that is suitably scaled according to the actual function of the computer 150 in the system). In detail, one or more microprocessors (mP) 156 control operation of the computer 150; a RAM 159 is directly used as a working memory by the microprocessors 156, and a ROM 162 stores basic code for a bootstrap of the computer 150. Several peripheral units are clustered around a local bus 165 (by means of respective interfaces). Particularly, a mass storage consists of one or more hard-disks 168 and drives 171 for reading CD-ROMs 174. Moreover, the computer 150 includes input units 177 (for example, a keyboard and a mouse), and output units 180 (for example, a monitor and a printer). A network adapter 183 is used to plug the computer 150 into the system. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
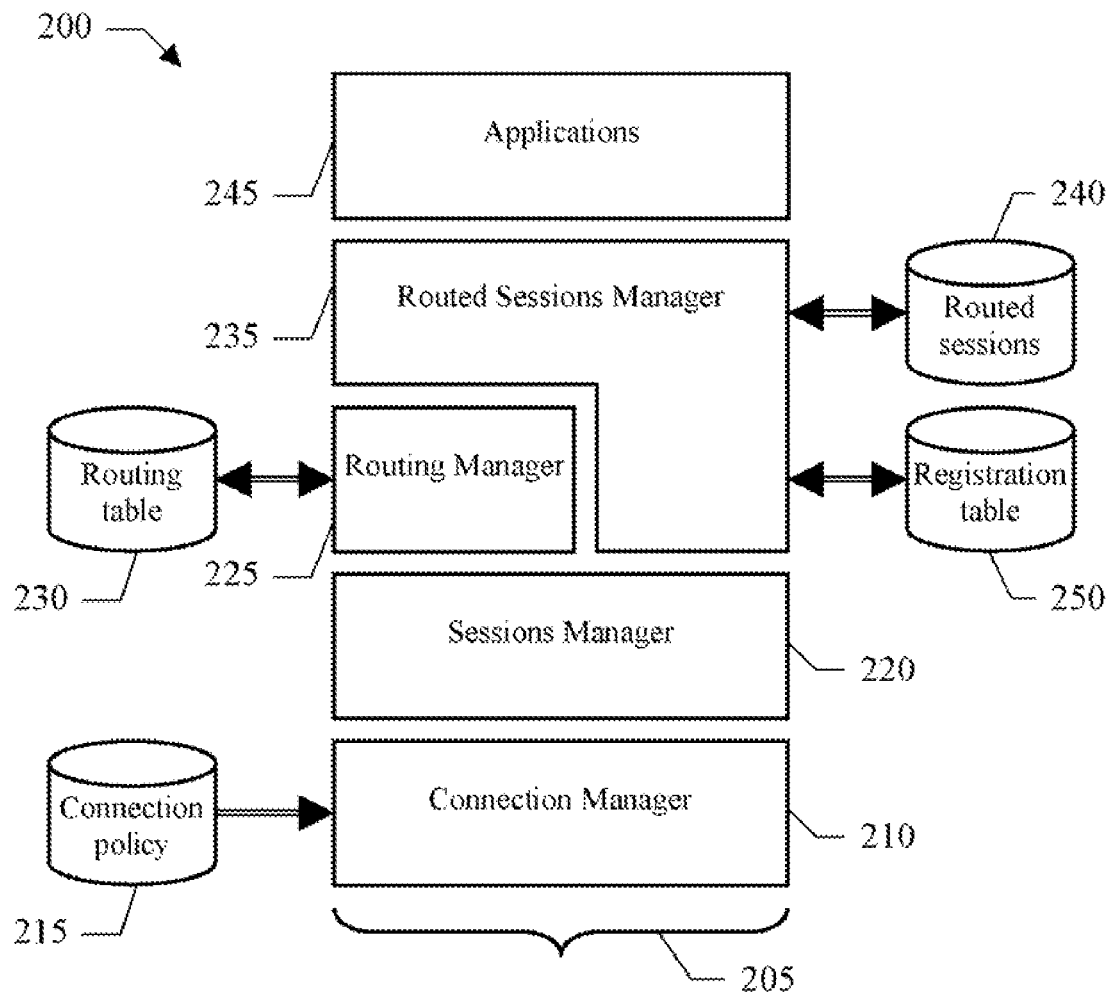
FIG. 2 illustrates the main software components that can be used to practice the solution according to an embodiment of the invention.

Moving to FIG. 2, the main software modules that run on a generic node of the above-described network (relay or gateway) are denoted as a whole with the reference 200. The information (programs and data) is typically stored on the hard-disk and loaded (at least partially) into the working memory of the node when the programs are running. The programs are initially installed onto the hard disk, for example, from CD-ROM.

Particularly, a stack 205 processes a set of protocol layers working together to define the desired communications; each layer of the stack 205 implements a specific abstraction, which exposes corresponding services for the higher layers.

Starting from the bottom of the stack 205, a Connection Manager (CM) 210 manages the actual transfer of raw data through a single point-to-point connection with an adjacent node of the network; at this level, the connection is completely agnostic to the meaning of the transmitted information. The Connection Manager 210 further implements the initiation and the holding of the connection, according to the corresponding connection policy stored in a table 215.

A Sessions Manager (SM) 220 multiplexes multiple sessions over the connection implemented by the Connection Manager 210. Each session consists of a lasting communication between the connected nodes; the information available over time in the different sessions is transmitted at interleaved packets (for example, using the HTTP or the BEEP protocol), so as to prevent any session from taking over the connection completely.

A Routing Manager (RM) 225 exploits the Sessions Manager 220 for maintaining a routing table 230. The routing table 230 includes an entry for each connection with an adjacent node (identified by a handle of the corresponding instance of the Connection Manager 210); the entry specifies all the nodes (by means of corresponding labels) that can be reached passing through it. Preferably, the entry also stores additional information relating to the connection (for example, a weight defined by several factors, such as its cost, speed, and the like).

At the top of the stack 205, a Routed Sessions Manager (RSM) 235 implements routed sessions between each pair of nodes at opposite ends of the network (i.e., gateways). Each routed session consists of a virtual session, which exploits multiple sessions along an end-to-end path between the two nodes. The Routed Sessions Manager 235 queries the Routing Manager 225 to determine the adjacent node through which the desired destination can be reached (according to the content of the routing table 230); the Routed Sessions Manager 235 then exploits the Sessions Manager 220 to pass the desired information to this adjacent node (across the interposed firewall). Service information about each active routed session (such as its handle, the type of service implemented, the label of the destination, and a handle of the corresponding session) is stored into a dedicated table 240.

The Routed Sessions Manager 235 exposes an Application Program Interface (API), which can be invoked by one or more applications 245 to manage corresponding routed sessions (without needing to know any further detail of their implementation by the lower layers of the stack 205). Particularly, each application 245 offering specific services registers for this purpose with the Routed Sessions Manager 235. The corresponding information (such as a respective identifier, a pointer to a callback function used to manage the service, and its signature typically specifying the handle of the current routed session, a received command, the label of the node requesting the service, and the passed payload) is stored in a dedicated table 250.

This architecture and its exploitation for transmitting information are described in greater detail, for a system wherein the nodes are logically organized in a hierarchical structure, in the above-cited documents US-A-20030123483 and US-A-2003126230.

Conversely, in the solution according to an embodiment of the present invention (as explained in detail in the following), the same routing mechanism is extended to whatever applications; particularly, this allows implementing communications between any pair of nodes in peer-to-peer applications. As above, the knowledge of the routing information is distributed across the nodes of the network (so that any security breach in one of the nodes does not allow an intruder to acquire the whole routing information of the network); the routing information is then propagated dynamically among the nodes of the network (with rules that prevent the generation of any propagation cycle).

As a result, it is possible to implement a recovery scheme in case of fail-over of any relays; indeed, should a node be not available, the routing mechanism can now switch to a different node of the network in an attempt to reach the desired destination (through an alternative path).

This strongly increases the reliability of the whole system; moreover, it is also possible to apply more sophisticated routing algorithms; for example, the node to which the information is to be passed can be selected (among the available ones) so as to optimize several parameters (such as the cost or the speed of the respective connection, as indicated by the corresponding weight indicated in the additional information of the routing table).

Figure 3A:
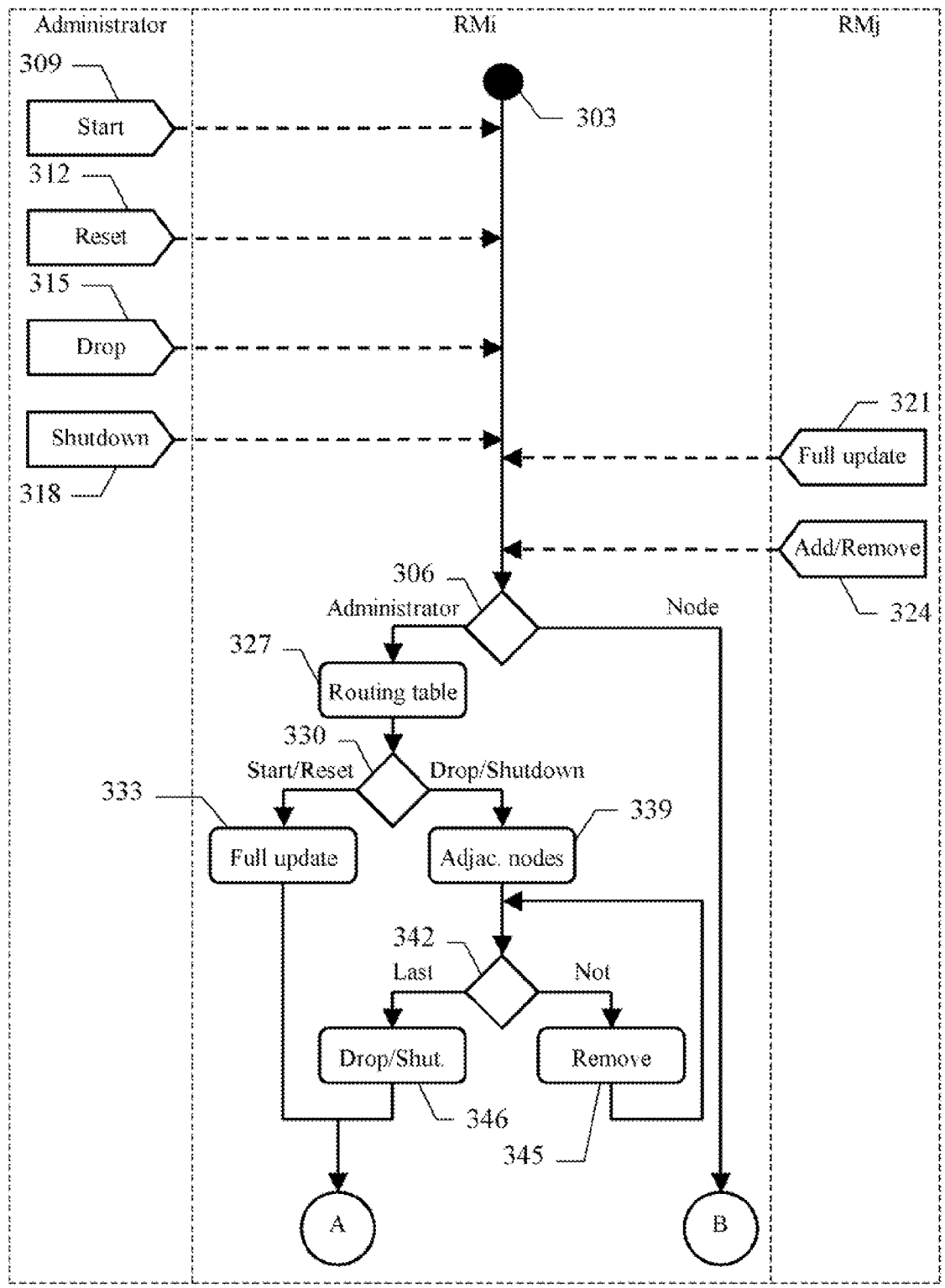
FIGS. 3a-3b show a diagram describing the flow of activities relating to an implementation of the solution according to an embodiment of the invention.
Figure 3B:
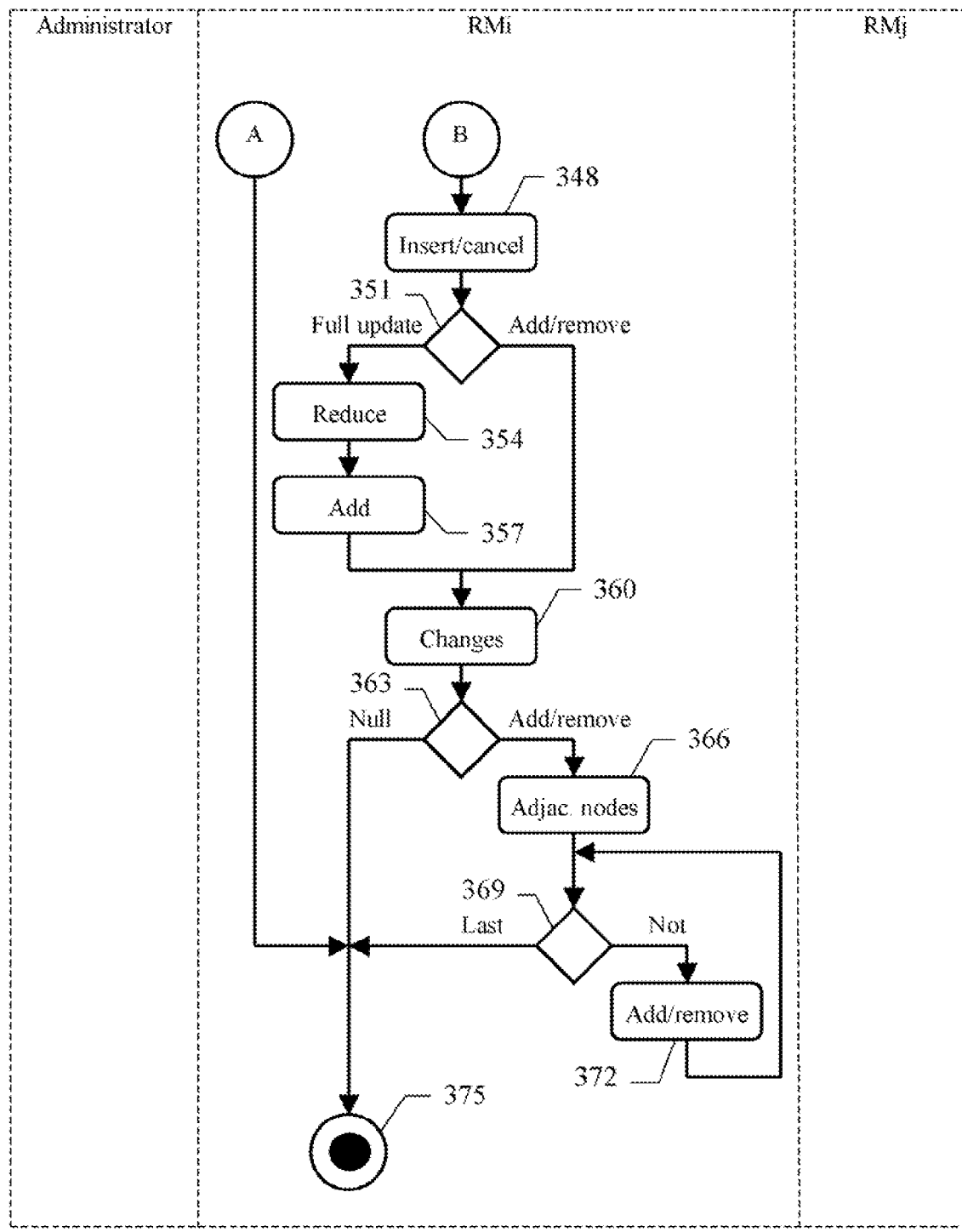

More in detail, as shown in FIGS. 3a-3b, the logic flow of an exemplary process that can be implemented in the above-described network to maintain the routing tables automatically is represented with a method 300.

The method begins at the black start circle 303 in the swim-lane of the Routing Manager of a generic node of the network (denoted with RMi and Ni, respectively). The Routing Manager RMi then enters an idle condition at block 306, waiting for any command from an administrator of the system of from any other node thereof.

Particularly, the administrator can decide to establish a new connection between a pair of nodes of the network; in this case, a corresponding command is submitted at block 309 to one of the nodes selected to be an initiator of the process (consisting of the node Ni in the example at issue). Typically, this happens during the setup of the network, or when it is expanded with the addition of new nodes.

Likewise, the administrator can restart a generic node so as to simulate the establishment of an (already existing) connection with an adjacent node; in this case as well, a corresponding command is submitted at block 312 to the desired node (always consisting of the node Ni). For example, this operation can be executed whenever the configuration of a node has been changed off-line (and it is then necessary to reset the routing information).

Considering now block 315, the administrator can drop a selected connection between a pair of adjacent nodes; as a result, a corresponding command is submitted at block 315 to both the nodes associated in the selected connection (one of them consisting of the node Ni). Typically, this happens when a problem occurs in the selected connection.

At the end, the administrator can select a node of the system to be shutdown; in this case as well, a corresponding command is submitted at block 318 to the selected node (node Ni). For example, this operation is executed when the node must be removed from the system.

On the other hand (as described in detail in the following), the Routing Manager of a different node of the system (denoted with RMj and Nj, respectively) can require a full update to the node Ni based on its routing table; as a result, a corresponding command is submitted at block 321 to the Routing Manager RMi.

Conversely, the same Routing Manager RMj can simply require to add or remove some nodes to/from the routing table of the node Ni; therefore, a corresponding command is submitted at block 324 to the Routing Manager RMi.

Returning now to the swim-lane of the Routing Manager RMi, the flow of activity branches from block 306 as soon as a command is received. Particularly, if the command is received from the administrator, the blocks 327-346 are executed, whereas if the command is received from another node the blocks 348-372 are executed; in both cases, the method then ends at the concentric white/black stop circles 375.

Considering now block 327 (command from the administrator), the nodes included in the routing table of the node Ni (i.e., the nodes reachable through it, including the node Ni itself) are determined. Two different execution paths are then followed according to the type of command that is submitted.

More specifically, the flow of activity descends into block 333 in response to the start command or to the reset command. As a result, a full update command relating to all the nodes of the routing table of the node Ni is submitted to the associated node in the new connection. The execution path then ends at the stop circles 375.

Conversely, the method passes from block 327 to block 339 when the drop command or the shutdown command is received. In this phase, the Routing Manager RMi selects the adjacent nodes to which a drop command relating to all the nodes of its routing table should be submitted; particularly, the selected adjacent nodes consist of the other node associated in the selected connection (for the drop command) or of all the nodes adjacent thereto (for the shutdown command).

A loop is then executed for each selected adjacent node; for this purpose, the method verifies at block 342 whether any selected adjacent node is still to be processed. If so, the remove command is submitted to the (current) selected adjacent node at block 345. The process then returns to block 342 to reiterate the same operations for the next selected adjacent nodes, until all them have been processed. At the end, the flow of activity descends into block 346, wherein the desired connection is dropped or the node Ni is shutdown (according to the received command).

With reference instead to block 348 (command from another node, such as Nj), the routing table of the node Ni is updated accordingly. The operation affects the entry associated with the connection between the node Ni and the node Nj; more specifically, when the add command is received the corresponding nodes are inserted whereas when the remove command is received the corresponding nodes are deleted.

The routing table of the node Ni is then propagated to its adjacent nodes. For this purpose, the flow of activity branches at decision block 351 according to the type of command that is submitted. Particularly, the process continues to block 354 in response to the full update command; in this phase, the nodes included in the routing table of the node Ni with the exception of the ones reachable through the node Nj (i.e., the ones specified in the entry associated with the corresponding connection) are determined. An add command relating to these nodes is returned to the Routing Manager RMj at block 357. The process then descends into block 360; the same point is also reached directly from block 351 otherwise (i.e., when the add command or the remove command is received).

With reference now to block 360, the changes applied to the routing table of the node Ni in response to the received command (i.e., the nodes that were inserted or deleted) are determined. These changes are then passed to the other nodes adjacent to the node Ni (with the exception of the node Nj from which they have been received). For this purpose, a test is preliminary made at block 363 to verify whether any changes have been actually applied. If not, the propagation process is aborted immediately, and the method descends to the stop circles 375. Conversely, the adjacent nodes different from the node Nj are determined at block 366 (as indicated in the routing table of the node Ni). A loop is then executed for each one of those adjacent nodes; for this purpose, the method verifies at block 369 whether any adjacent node is still to be processed. If so, a corresponding command is submitted to the (current) adjacent node at block 372; particularly, an add command is issued when the changes involved the insertion of nodes to or a remove command is issued when the changes involved the deletion of nodes from the routing table of the node Ni. The process then returns to block 369 to reiterate the same operations for the next adjacent nodes. As soon as the exit condition of the loop is satisfied (i.e., the changes have been propagated to all the adjacent nodes or the node Nj is the only one available), the process descends to the stop circles 375.

In order to explain an exemplary application of the above-described technique, reference will be made in the following to a very simple network only including three nodes, which are denoted with Na, Nb and Nc (each one having a respective routing table RTa, RTb and RTc). Any connection managed by a generic i-th node with an adjacent j-th node (with i,j=a . . . c) is denoted with Cij.

Particularly, FIGS. 4a-4d relate to the establishment of a first connection in the network. For this purpose, the dynamic behavior of the structure is described in the sequence diagram of FIG. 4a (by means of a series of messages exchanged between its relevant components, which messages are denoted with progressive sequence numbers preceded by the symbol "P").

At the beginning (see FIG. 4b), the system only includes the nodes Na, Nb and Nc without any connection between them; therefore, each routing table RTa, RTb and RTc has a single entry for the corresponding node Na, Nb and Nc, respectively.

The administrator establishes a new connection between the nodes Nb and Na (see FIG. 4c); the administrator then submits a corresponding command to the routing manager of the node selected to be the initiator of the process, i.e., the Routing Manager RMb in the example at issue (message P1: \Start\). In response thereto, the Routing Manager RMb retrieves all the nodes of its routing table RTb (i.e., the node Nb); a full update command relating to this node, represented with the legend ^Nb, is then submitted to the associated node Na in the new connection (message P2: tell(\Nb\FULL\)). As a result, the routing table RTa is updated accordingly (as indicated with characters in reverse background); particularly, it is created a new entry for the connection with the node Nb, i.e., Cab, and the node indicated in the full updated command, i.e., Nb, is added (message P3: updateRT( )).

Figure 4A:
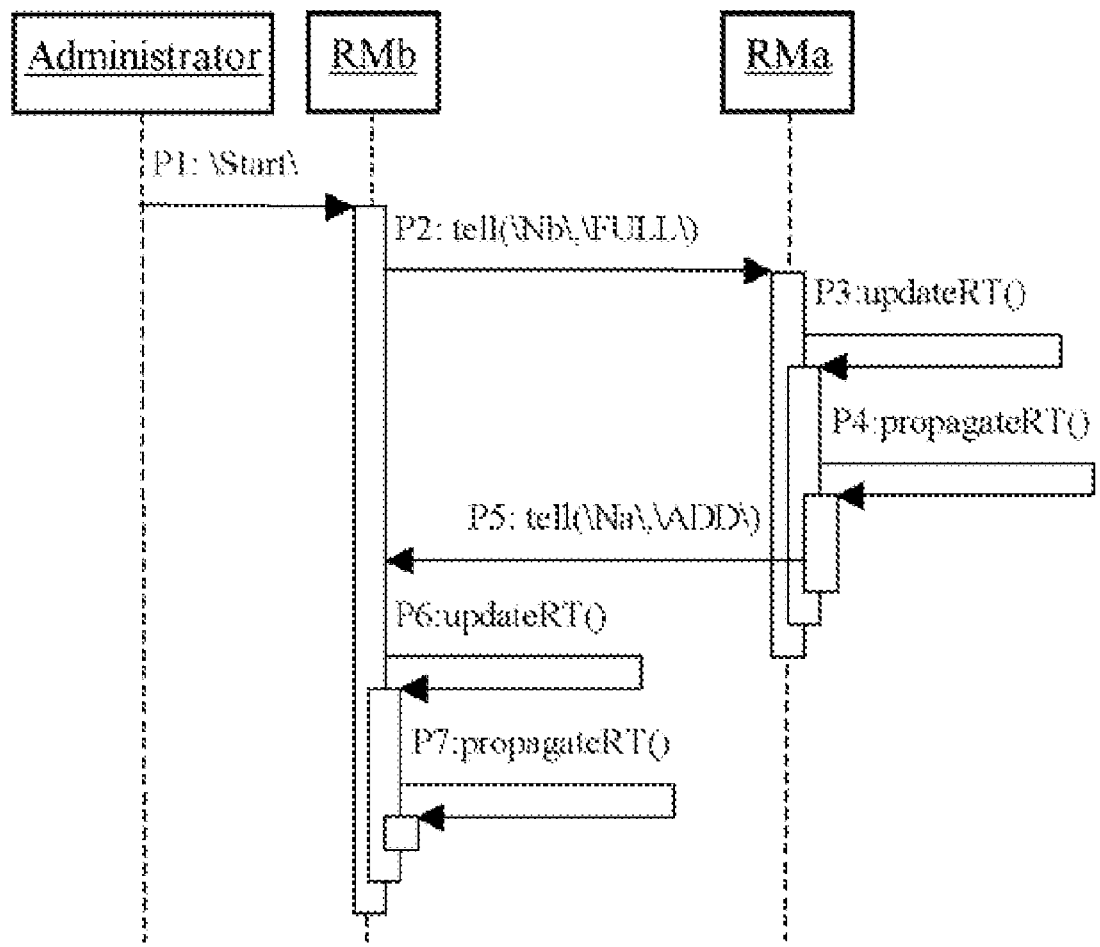
FIGS. 4a-4d, 5a-5d, 6a-6f, 7a-7e and 8a-8e illustrate exemplary applications of the solution according to an embodiment of the invention.
Figure 4B:
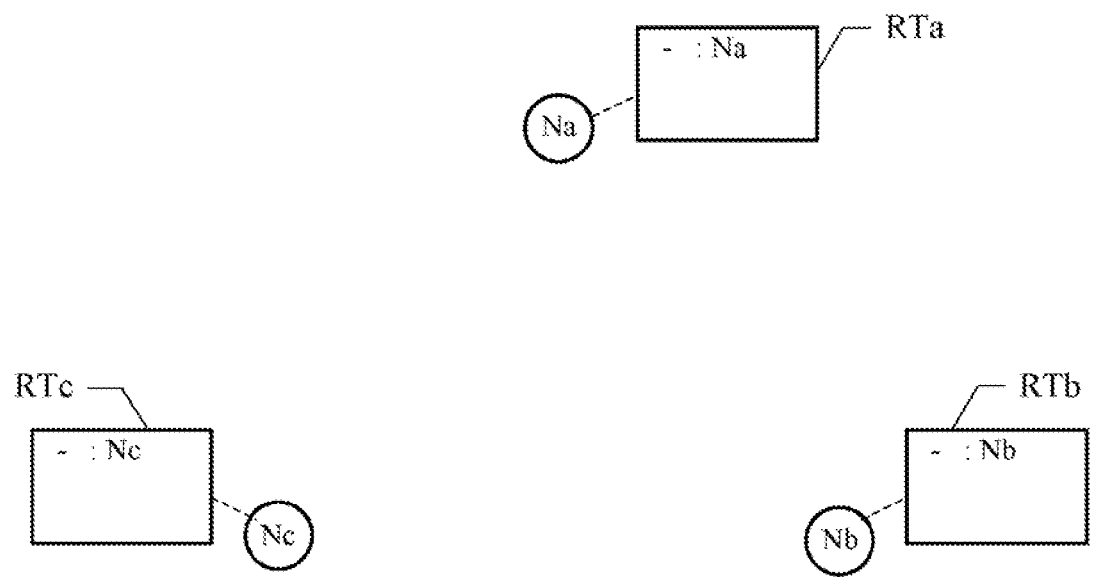
Figure 4C:
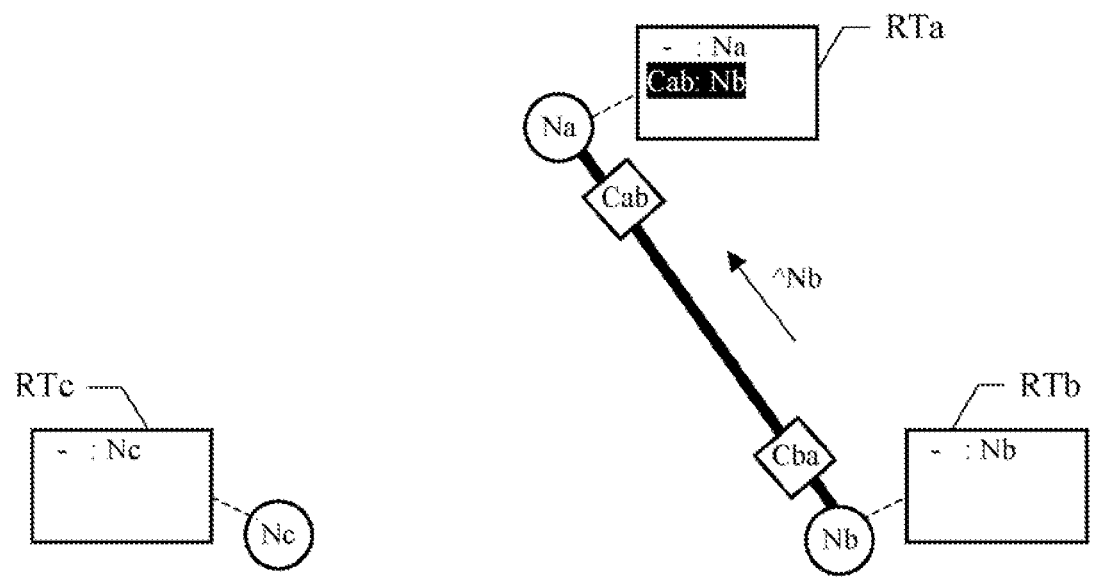
Figure 4D:
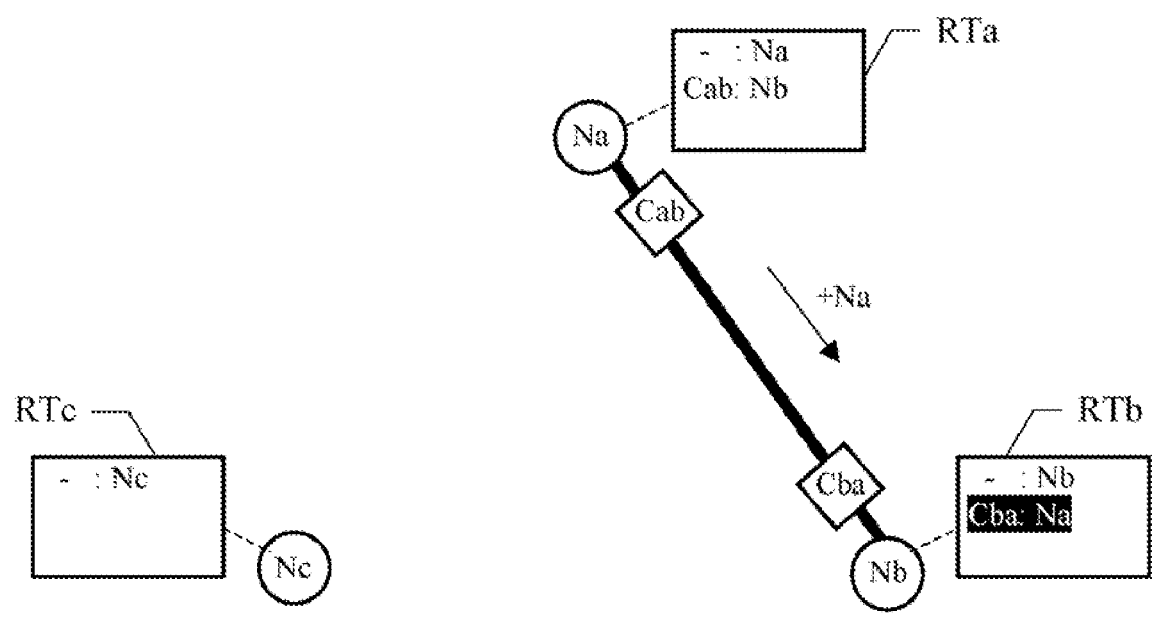

The routing table RTa is then propagated to the adjacent nodes (message P4: propagateRT( )), in this case consisting of the node Nb only (see FIG. 4d). For this purpose, the Routing Manager RMa determines the nodes of its routing table RTa minus the ones reachable through the node Nb (i.e., Na); an add command relating to this node, represented with the legend +Na, is then submitted to the node Nb (message P5: tell(\Na\ADD\)). As a result, the routing table RTb is updated accordingly, by creating a new entry for the connection with the node Na, i.e., Cba, and then adding the node indicated in the add command, i.e., Na, (message P6: updateRT( )). The routing table RTb should be now propagated to the adjacent nodes different from the node Na (message P7: propagateRT( )); however, no other adjacent node exists, so that the propagation process ends.

Figure 5A:
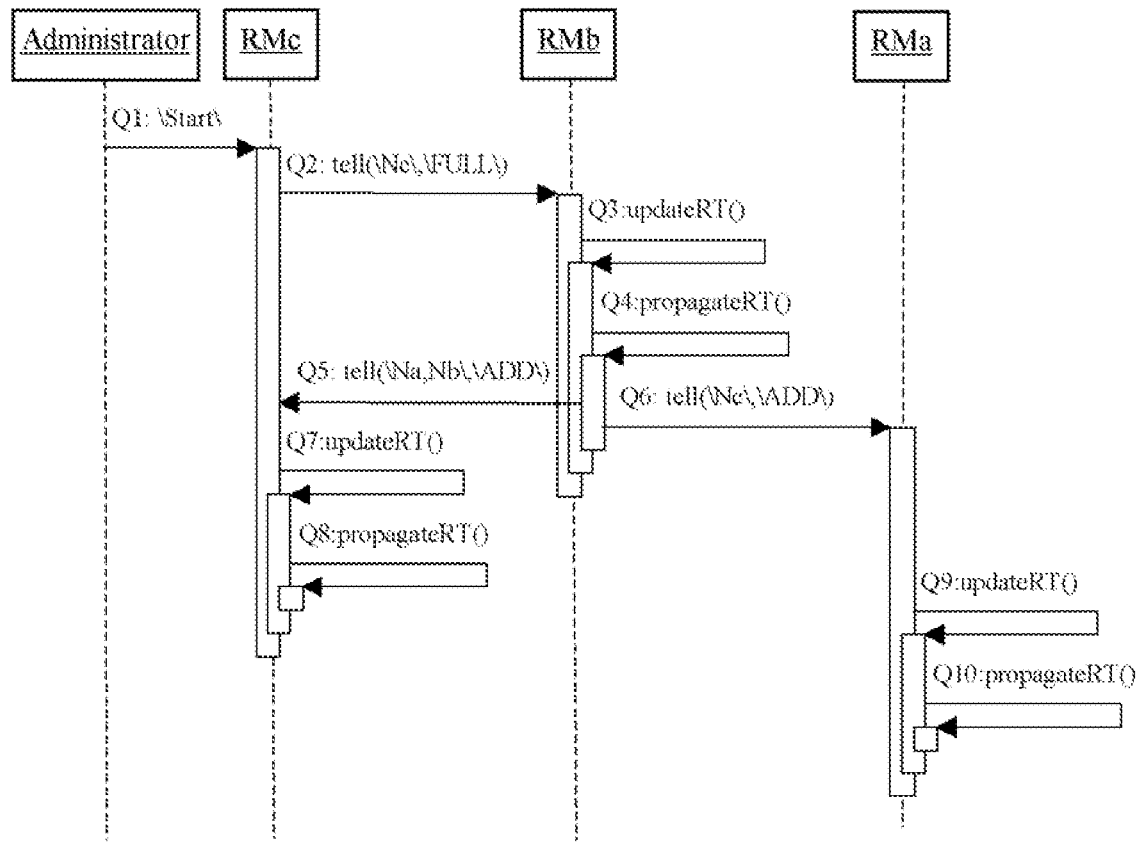
Figure 5B:
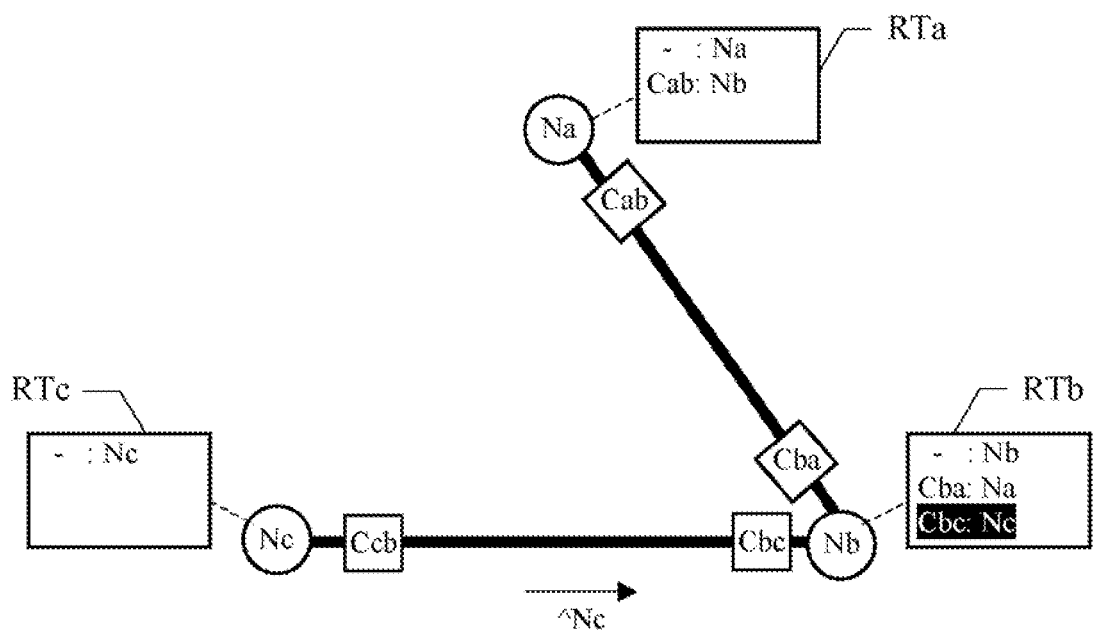
Figure 5C:
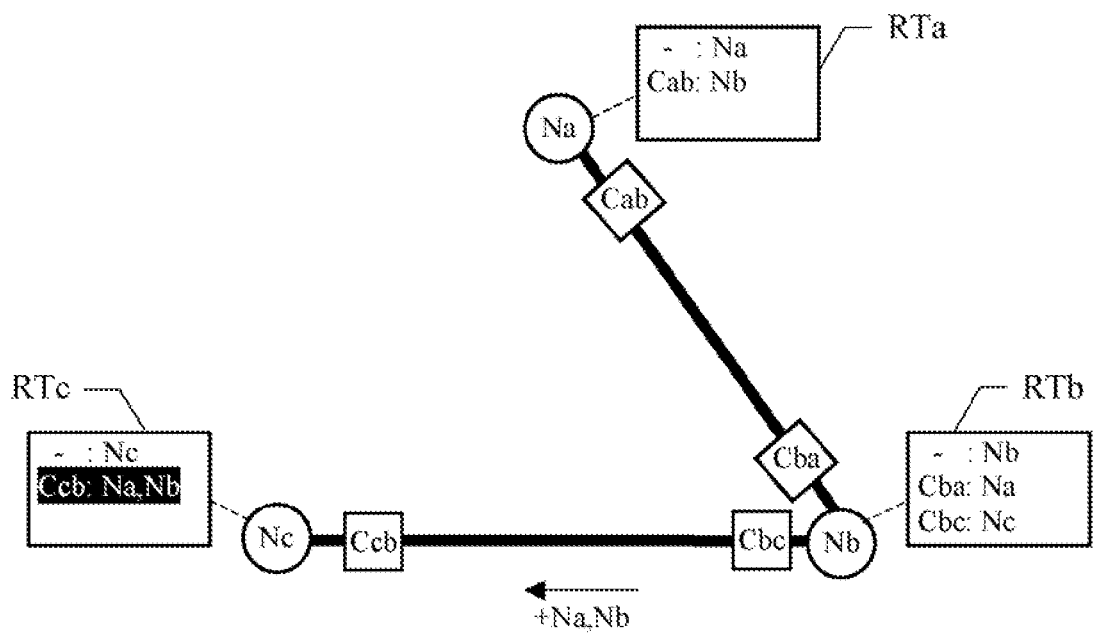
Figure 5D:
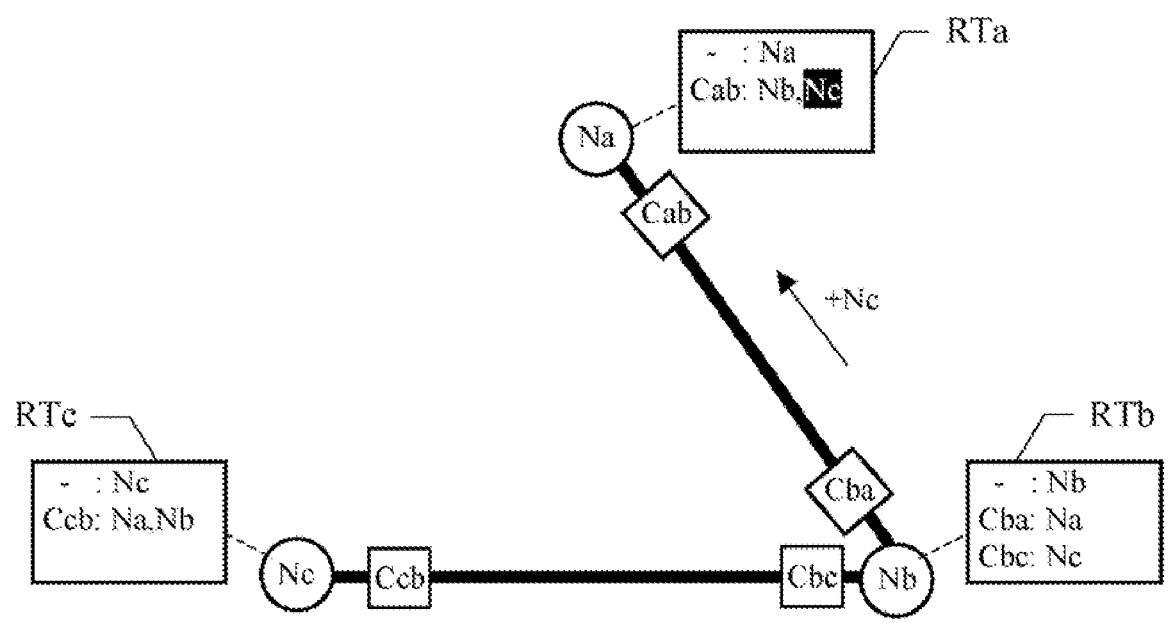

The establishment of a further connection in the network so obtained in illustrated in FIGS. 5a-5d (with the sequence diagram of FIG. 5a that describes the dynamic behavior of the structure by means of a series of messages denoted with progressive sequence numbers preceded by the symbol "Q").

Particularly, the administrator establishes a new connection between the nodes Nc and Nb (see FIG. 5b); the administrator then submits a corresponding command to the routing manager of the node selected to be the initiator of the process, i.e., the Routing Manager RMc in the example at issue (message Q1: \Start\). In response thereto, the Routing Manager RMc submits a full update command to the Routing Manager RMb including all the nodes of its routing table, i.e., ^Nc (message Q2: tell(\Nc\FULL\)). As a result, the routing table RTb is updated accordingly, by creating a new entry for the corresponding connection Cbc and then adding the node Nc (message Q3: updateRT( )).

The routing table RTb is now propagated to the adjacent nodes (message Q4: propagateRT( )). In detail, the Routing Manager RMb submits an add command to the Routing Manager RMc; the add command includes the nodes of its routing table RTb minus the ones reachable through the node Nc, i.e., +Na,Nb (message Q5: tell(\Na,Nb\ADD\)). Moreover, the Routing Manager RMb submits a further add command to each adjacent node different from the node Nc (i.e., to the node Na); this add command includes the nodes that have been inserted into the routing table RTb, i.e., +Nc (message Q6: tell(\Nc\ADD\)).

Moving now to the Routing Manager RMc (see FIG. 5c), in response to the add command +Na,Nb from the node Nb the routing table RTc is updated accordingly, by creating a new entry for the corresponding connection Ccb and then adding the nodes Na,Nb (message Q7: updateRT( )). The routing table RTc should be now propagated to the adjacent nodes different from the node Nb (message Q8: propagateRT( )); however, no other adjacent node exists, so that the propagation process is stopped.

With reference instead to the Routing Manager RTa (see FIG. 5d), in response to the add command +Nc from the node Nb the routing table RTa is updated by adding the node Nc to the entry associated with the corresponding connection Cab (message Q9: updateRT( )). The routing table RTa should be now propagated to the adjacent nodes different from the node Nb (message Q10: propagateRT( )); however, in this case as well no other adjacent node exists, so that the propagation process ends.

Figure 6A:
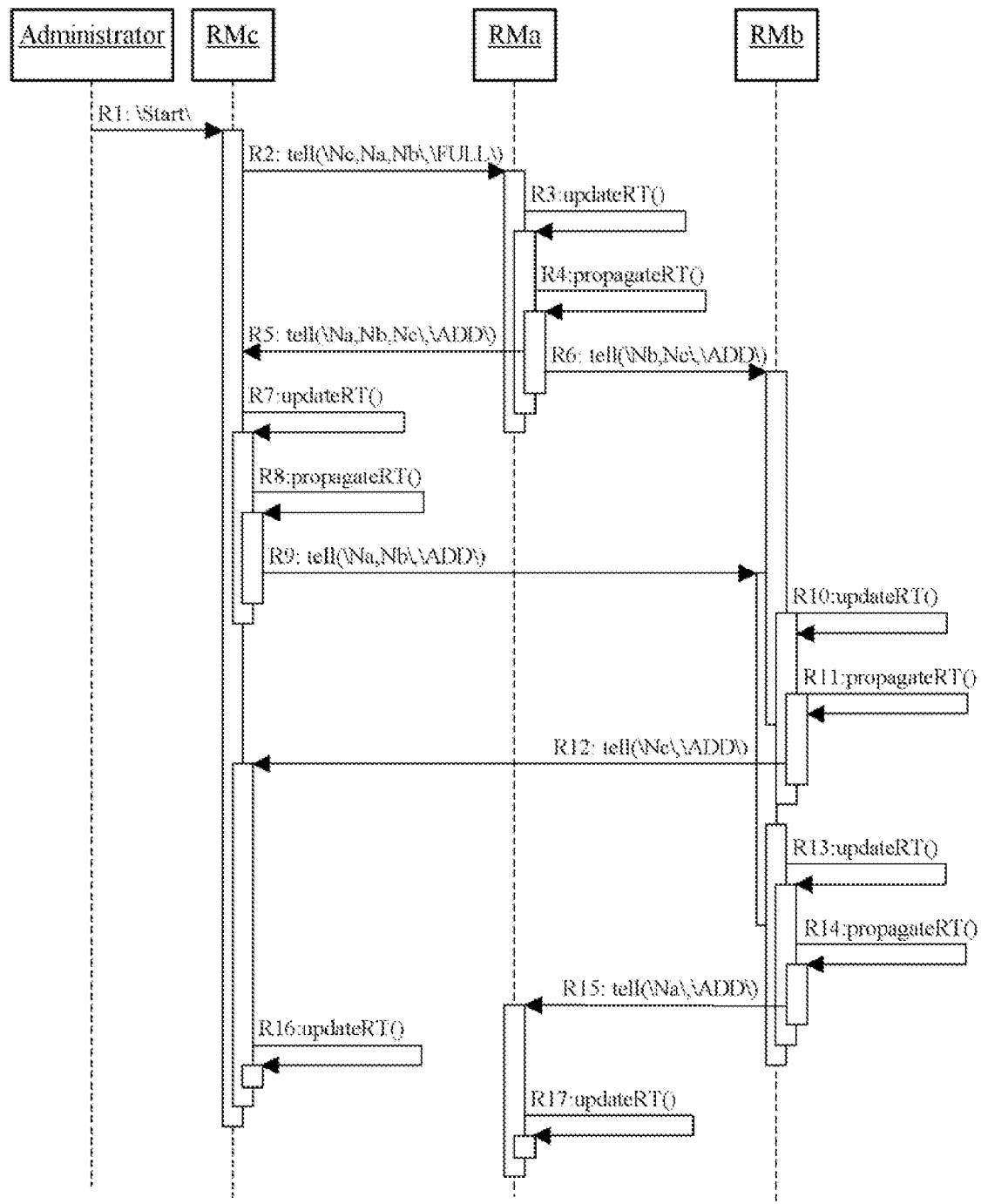
Figure 6B:
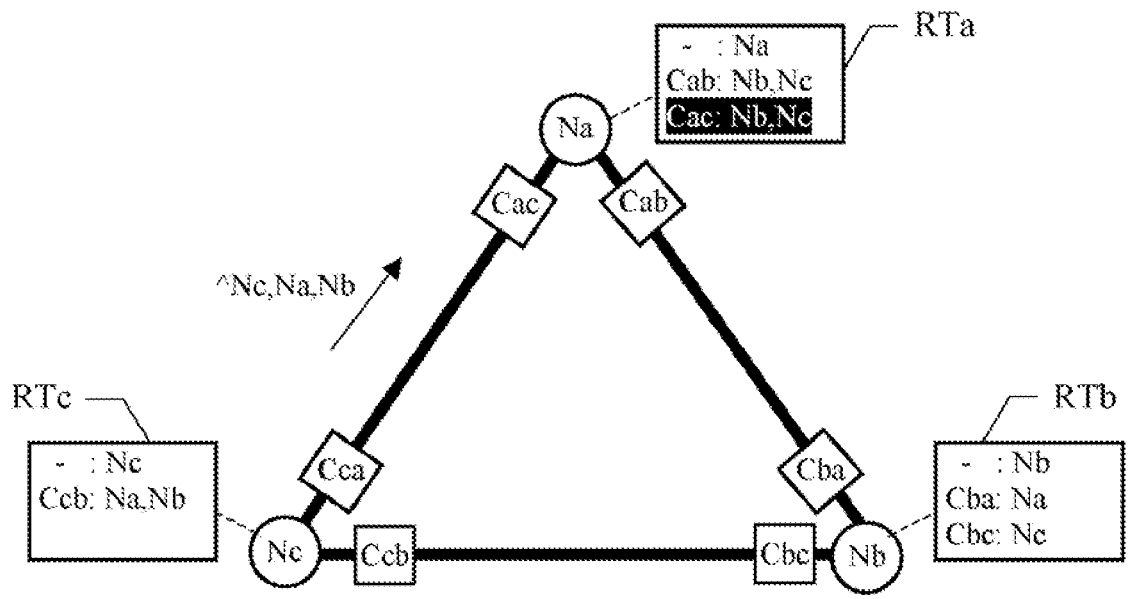
Figure 6C:
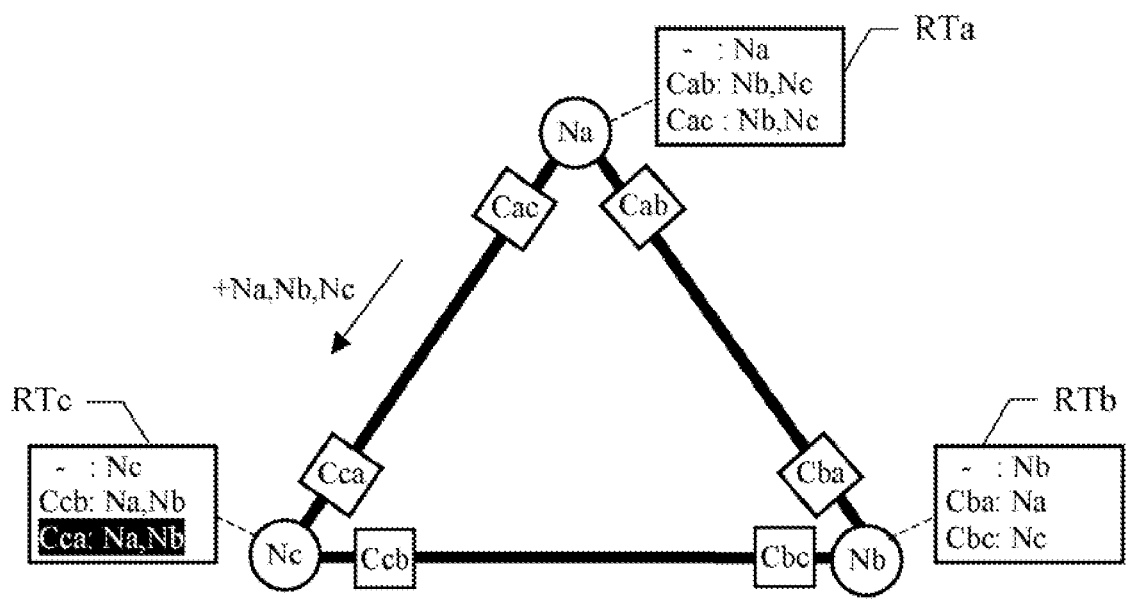
Figure 6D:
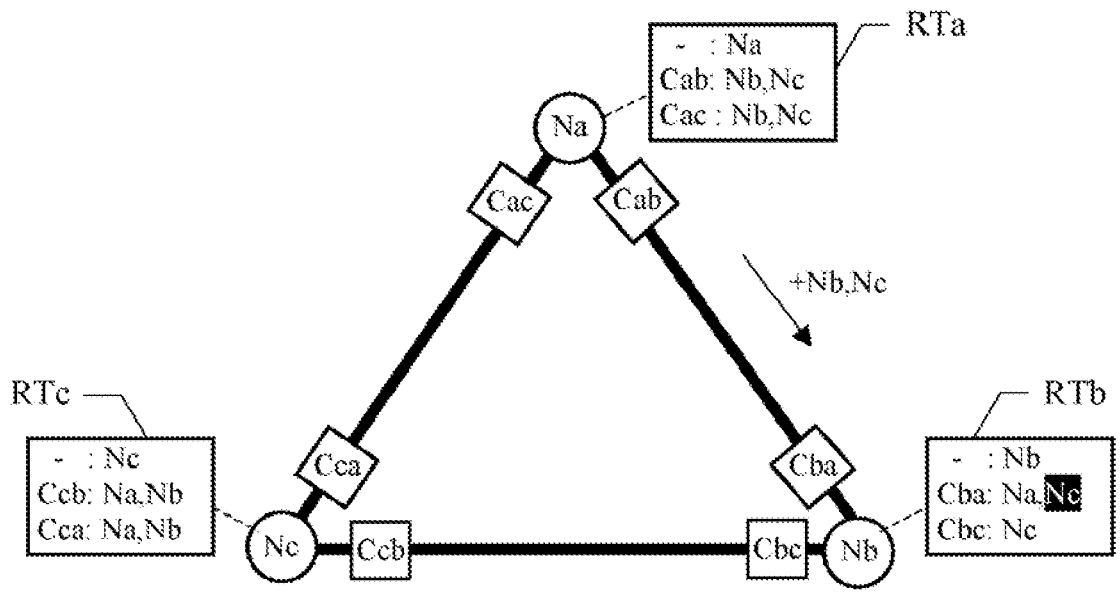
Figure 6E:
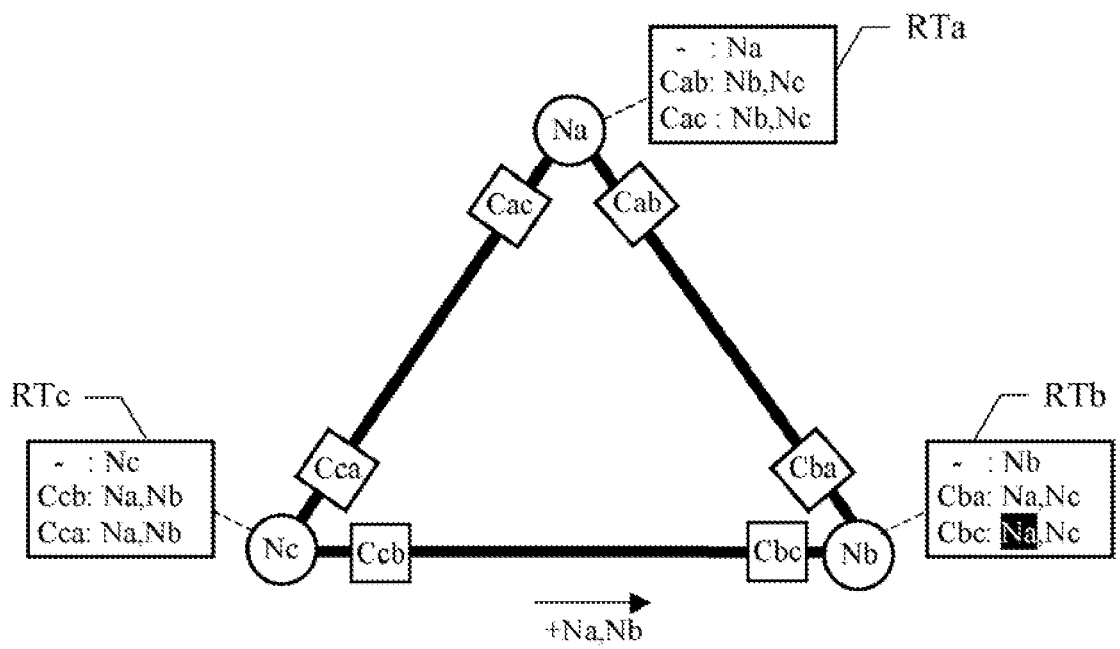
Figure 6F:
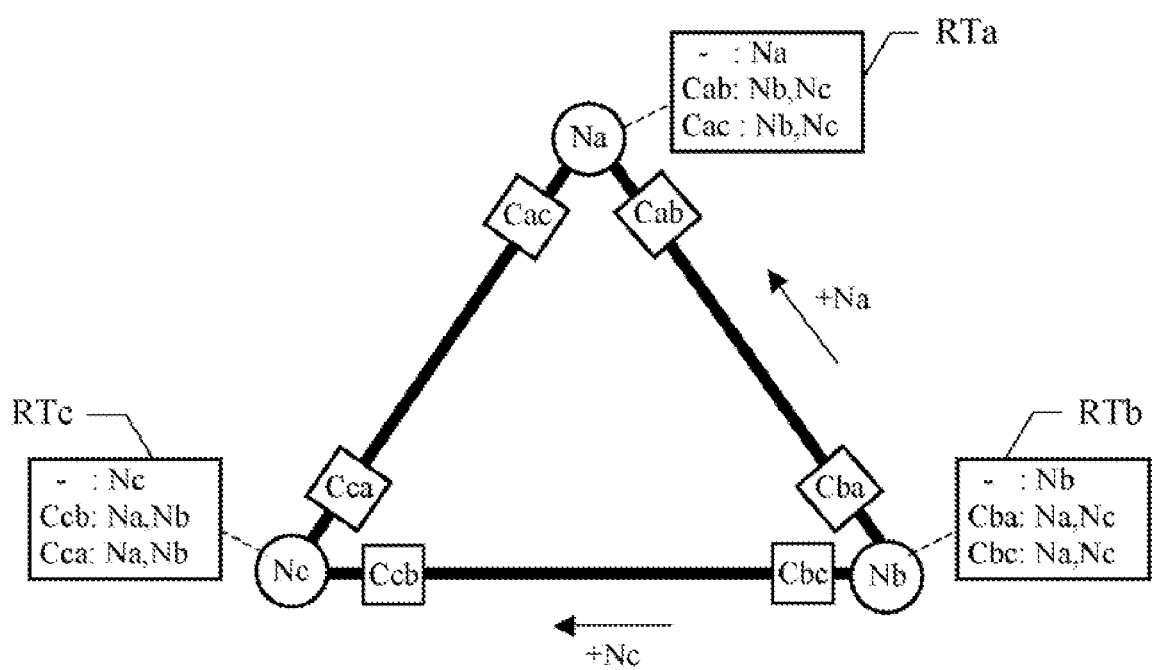

The completion of the network with the establishment of its last connection in illustrated in FIGS. 6a-6f (with the sequence diagram of FIG. 6a that describes the dynamic behavior of the structure by means of a series of messages denoted with progressive sequence numbers preceded by the symbol "R").

Particularly, the administrator establishes a new connection between the nodes Nc and Na (see FIG. 6b); the administrator then submits a corresponding command to the routing manager of the node selected to be the initiator of the process, i.e., the Routing Manager RTc in the example at issue (message R1: \Start\). In response thereto, the Routing Manager RMc submits a full update command to the Routing Manager RMa including all the nodes of its routing table, i.e., ^Nc,Na, Nb (message R2: tell(\Nc,Na,Nb\FULL\)). As a result, the routing table RTa is updated accordingly, by creating a new entry for the corresponding connection Cac and then adding the nodes Nb,Nc different from itself (message R3: updateRT( )).

The routing table RTa is then propagated to the adjacent nodes (message R4: propagateRT( )). In detail, the Routing Manager RMa submits an add command to the Routing Manager RMc; the add command includes the nodes of its routing table RTa minus the ones reachable through the node Nc, i.e., +Na,Nb,Nc (message R5: tell(\Na,Nb,Nc\ADD\)). Moreover, the Routing Manager RMa submits a further add command to each adjacent node different from the node Nc (i.e., to the node Nb); this add command includes the nodes that have been inserted into the routing table RTa, i.e., +Nb,Nc (message R6: tell(\Nb,Nc\ADD\)).

Moving now to the Routing Manager RTc (see FIG. 6c), in response to the add command +Na,Nb,Nc from the node Na the routing table RTc is updated accordingly, by creating a new entry for the corresponding connection Cca and then adding the nodes Na,Nb different from itself (message R7: updateRT( )). The routing table RTc is in turn propagated to the adjacent nodes different from the node Na, i.e., to the node Nb (message R8: propagateRT( )); for this purpose, the Routing Manager RMc submits an add command including the nodes that have been inserted into the routing table RTc, i.e., +Na,Nb (message R9: tell(\Na,Nb\ADD\)).

With reference instead to the Routing Manager RMb (see FIG. 6d), in response to the add command +Nb,Nc from the node Na the routing table RTb is updated by adding the node Nc (different from itself) to the entry associated with the corresponding connection Cba (message R10: updateRT( )). The routing table RTc is then propagated to the adjacent nodes different from the node Na, i.e., to the node Nc (message R11: propagateRT( )); for this purpose, the Routing Manager RMb submits an add command including the nodes that have been inserted into the routing table RTb, i.e., +Nc (message R12: tell(\Nc\ADD\)).

At the same time (see FIG. 6e), in response to the add command +Na,Nb from the node Nc the routing table RTb is updated by adding the node Na (different from itself) to the entry associated with the corresponding connection Cbc (message R13: updateRT( )). The routing table RTb is then propagated to the adjacent nodes different from the node Nc, i.e., to the node Na (message R14: propagateRT( )); for this purpose, the Routing Manager RMb submits an add command including the nodes that have been inserted into the routing table RTb, i.e., +Na (message R15: tell(\Na\ADD\)).

Returning to the Routing Manager RTc (see FIG. 6f), in response to the add command +Nc from the node Nb the routing table RTc should be updated accordingly (message R16: updateRT( )); however, in this case no node is to be inserted, so that the propagation process is stopped. Likewise, when the Routing Manager RMa receives the add command +Na from the node Nb, the routing table RTa should be updated accordingly (message R17: updateRT( )); in this case as well, no node is to be inserted so that the propagation process ends.

Figure 7A:
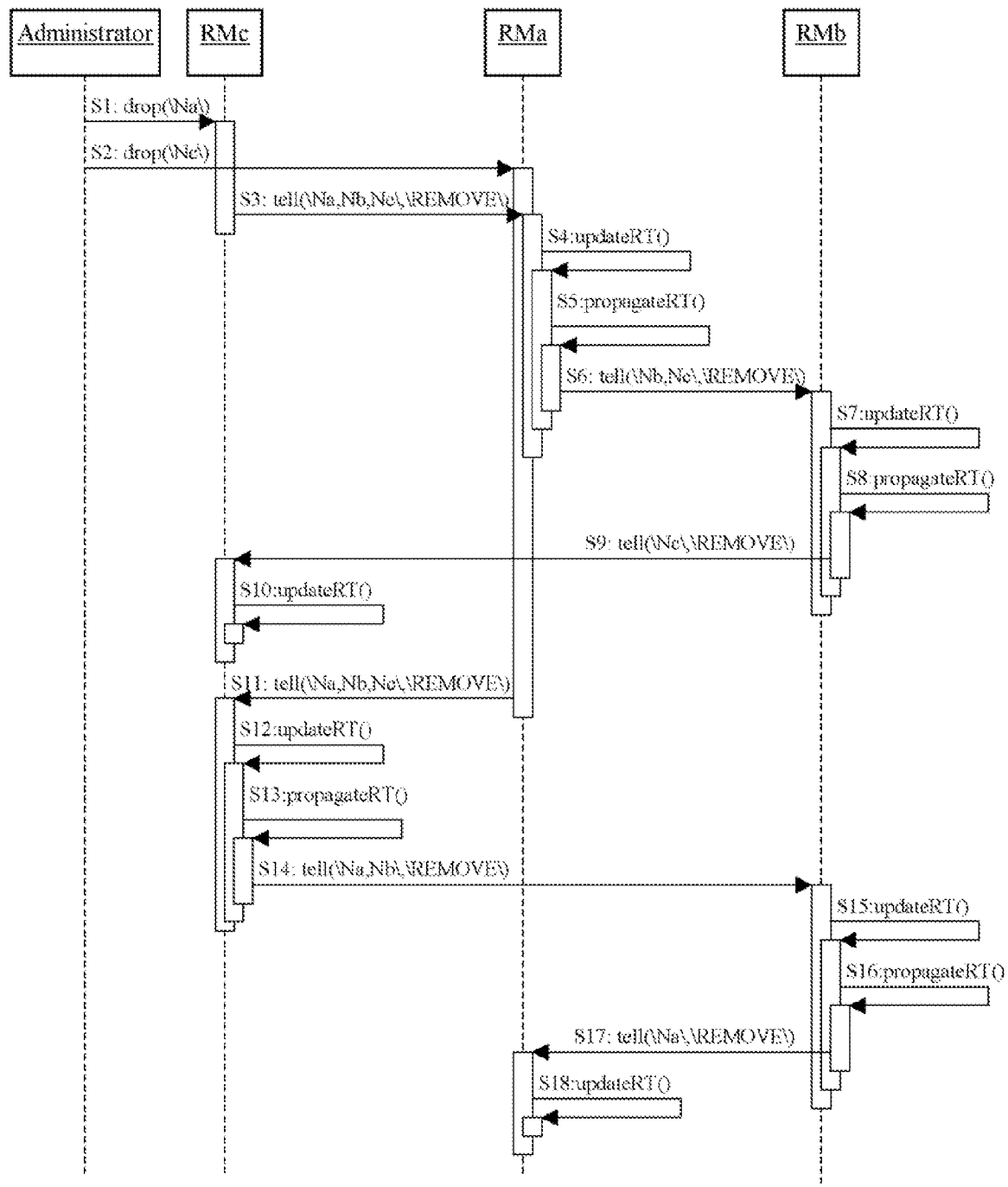
Figure 7B:
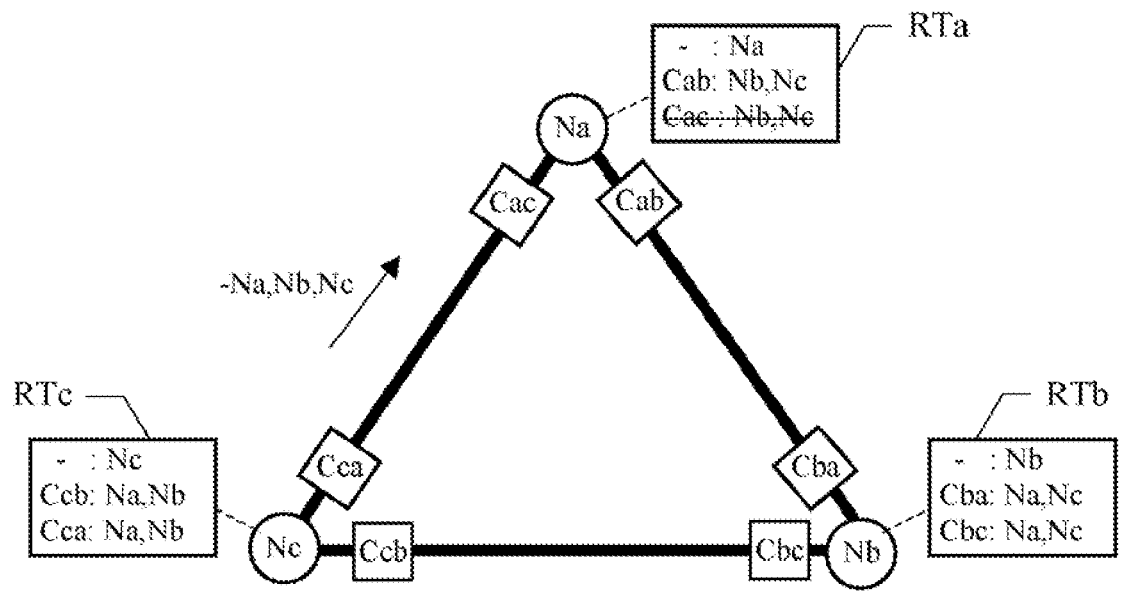
Figure 7C:
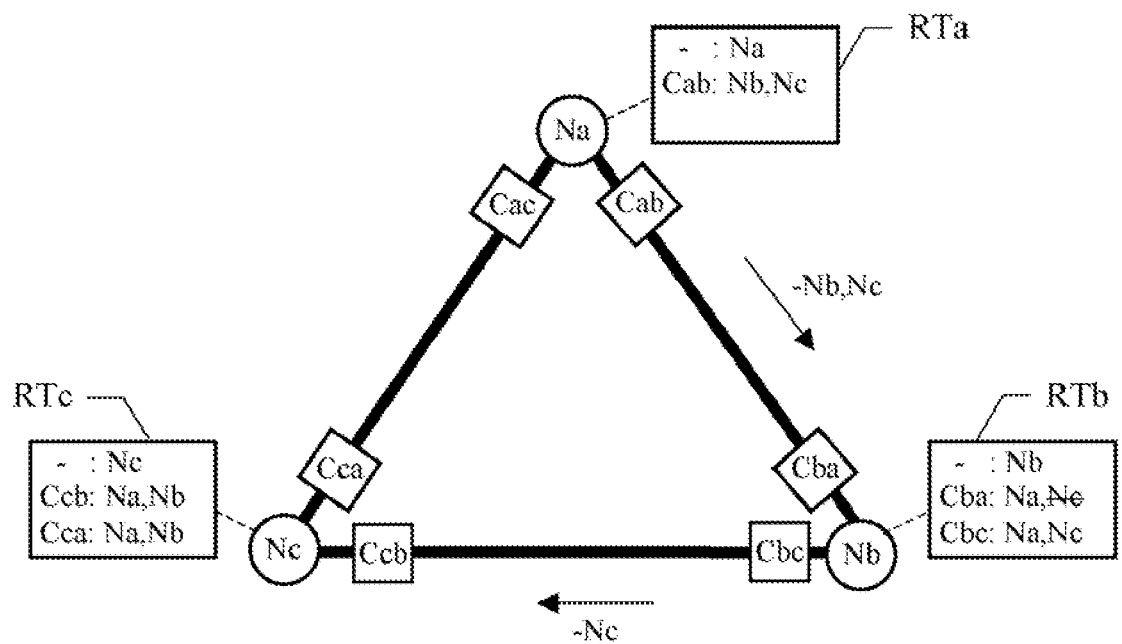
Figure 7D:
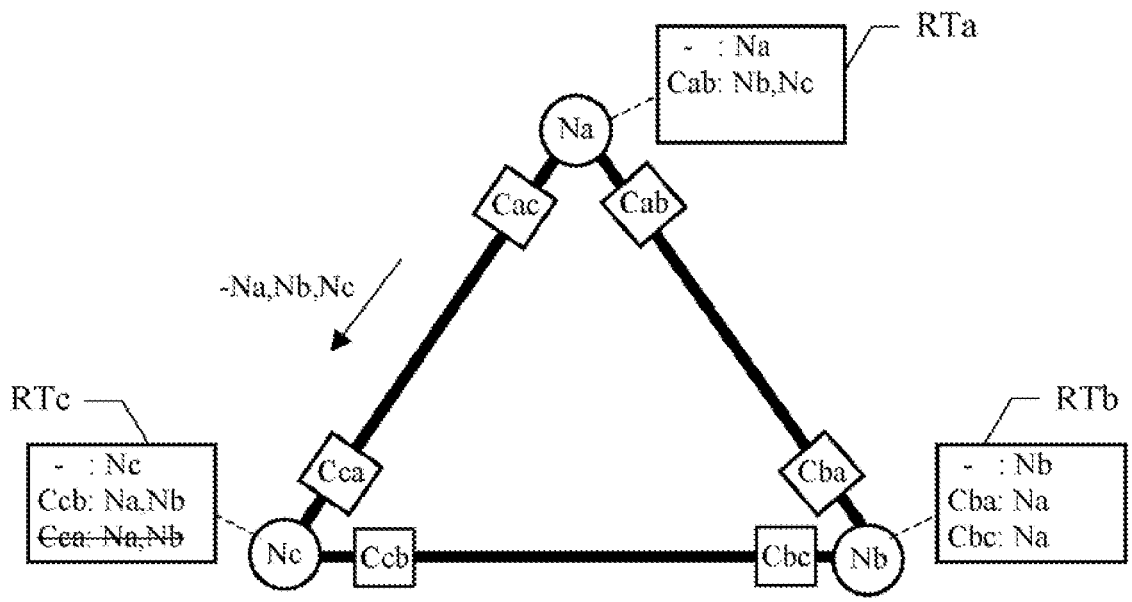
Figure 7E:
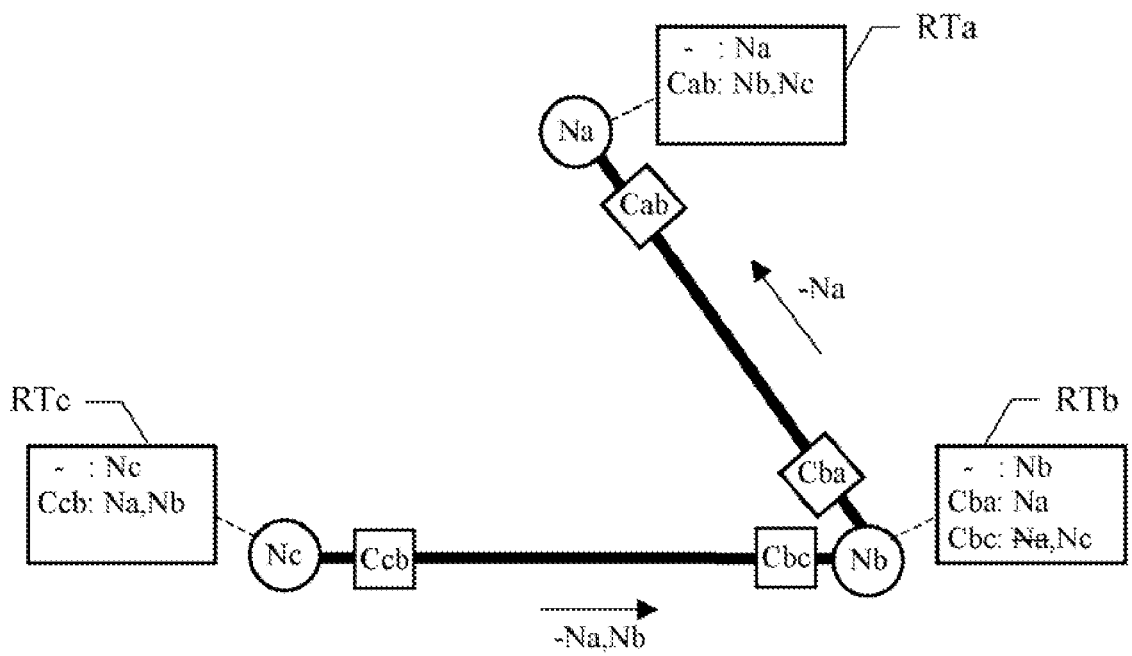

The dropping of a selected connection in the network so obtained is instead illustrated in FIGS. 7a-7e (with the sequence diagram of FIG. 7a that describes the dynamic behavior of the structure by means of a series of messages denoted with progressive sequence numbers preceded by the symbol "S").

For example, let us assume that the administrator decides to drop the connection between the nodes Nc and Na. For this purpose, the administrator submits a command to the corresponding Routing Managers RMc and RMa; more in detail, the administrator requests the Routing Manager RMc to drop the connection Cca with the node Na (message S1: Drop (\Na\)), and it requests the Routing Manager RMa to drop the connection Cac with the node Nc (message S2: Drop(\Nc\)).

In response thereto, the Routing Manager RMc retrieves all the nodes of its routing table RTc (i.e., Na, Nb and Nc); a remove command relating to those nodes, represented with the legend −Na,Nb,Nc, is then submitted to the node Na (message S3: tell(\Na,Nb,Nc\,\REMOVE\).

Moving now to the Routing Manager RMa (see FIG. 7b), in response to the remove command −Na,Nb,Nc from the node Nc the routing table RTa is updated accordingly, by deleting the nodes Nb,Nc from the entry for the corresponding connection Cac (message S4; updateRT( )); as a result, the entry itself associated with the connection Cac is deleted (since no node can be reached through it any longer). The routing table RTa is then propagated to the adjacent nodes different from the node Nc, i.e., to the node Nb (message S5: propagateRT( )); for this purpose, the Routing Manager RMa submits a remove command including the nodes that have been deleted from the routing table RTa, i.e., −Nb,Nc (message S6; tell(\Nb,Nc\REMOVE\)).

As a result (see FIG. 7c), the routing table RTb is updated by removing the node Nc from the entry associated with the corresponding connection Cba (message S7: updateRT( )). The routing table RTb is then propagated to the adjacent nodes different from the node Na, i.e., to the node Nc (message S8: propagateRT( )); for this purpose, the Routing Manager RMb submits a remove command including the nodes that have been deleted from the routing table RTb, i.e., −Nc (message S9: tell(\Nc\REMOVE\)). Returning to the Routing Manager RTc, in response thereto the corresponding routing table RTc should be updated accordingly (message S10: updateRT( )); however, in this case no node is to be deleted, so that the propagation process is stopped.

At the same time, in response to the drop command relating to the node Nc the Routing Manager RMa retrieves all the nodes of its routing table RTa (i.e., Na, Nb and Nc), and submits a corresponding remove command −Na,Nb,Nc to the node NC (message S11: tell(\Na,Nb,Nc\,\REMOVE\).

Moving now to the Routing Manager RMc (see FIG. 7d), in response to the remove command −Na,Nb,Nc from the node Na the routing table RTc is updated accordingly, by deleting the nodes Na,Nb from the entry for the corresponding connection Cca (message S12: updateRT( )); as a result, the entry itself associated with the connection Cca is deleted (since no node can be reached through it any longer). The routing table RTc is then propagated to the adjacent nodes different from the node Na, i.e., to the node Nb (message S13: propagateRT( )); for this purpose, the Routing Manager RMc submits a remove command including the nodes that have been deleted from the routing table RTc, i.e., −Na,Nb (message S14: tell(\Na,Nb\REMOVE\)).

As a result (see FIG. 7e), the routing table RTb is updated by removing the node Na from the entry associated with the corresponding connection Cbc (message S15: updateRT( )). The routing table RTb is then propagated to the adjacent nodes different from the node Nc, i.e., to the node Na (message S16; propagateRT( )); for this purpose, the Routing Manager RMb submits a remove command including the nodes that have been deleted from the routing table RTb, i.e., −Na (message S17: tell(\Na\REMOVE\)). Returning to the Routing Manager RMa, in response thereto the corresponding routing table RTa should be updated accordingly (message S18: updateRT( )); however, no node is to be deleted, so that the propagation process ends. At this point, the desired connection Cac/Cca can be actually dropped.

Figure 8A:
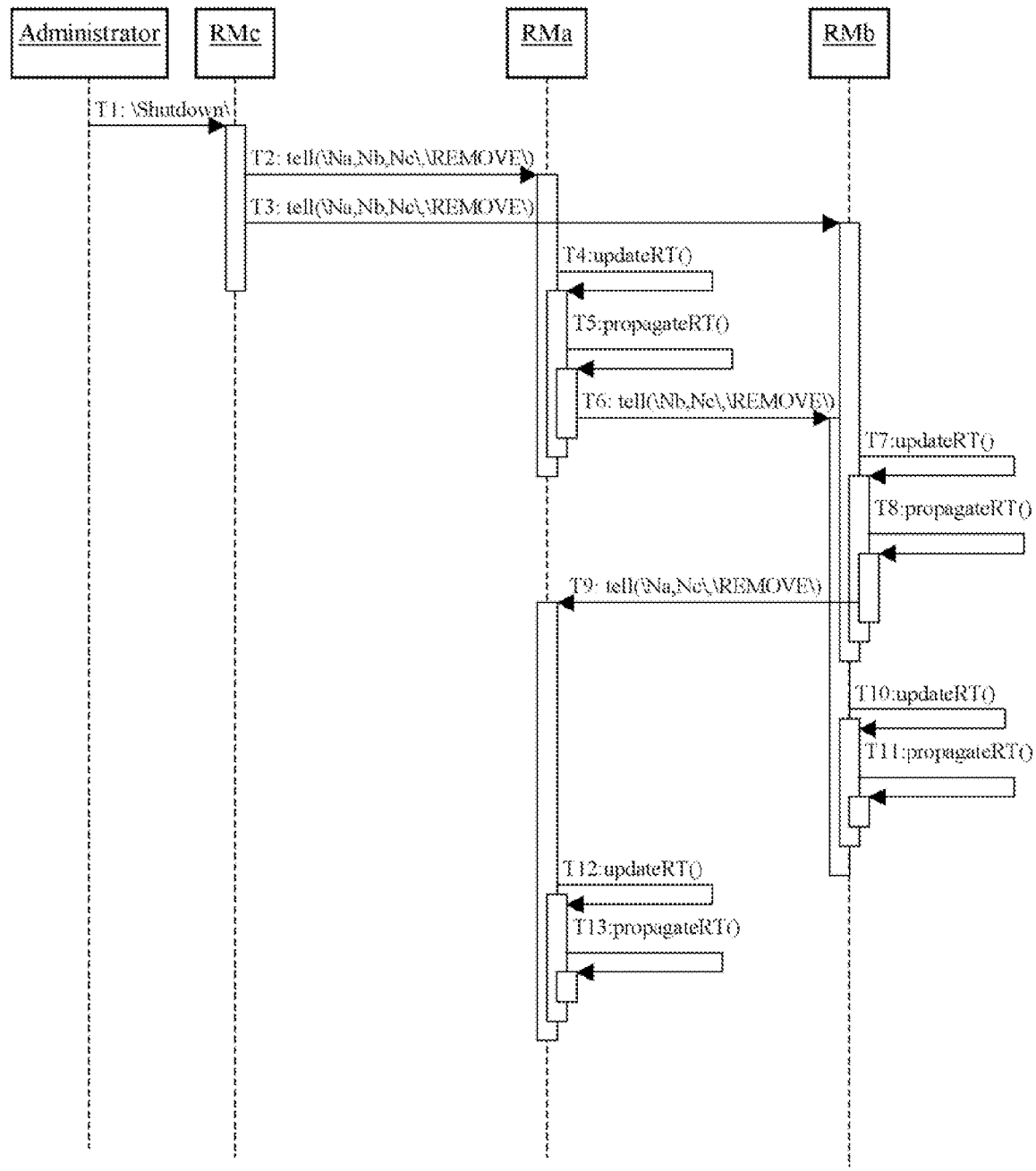
Figure 8B:
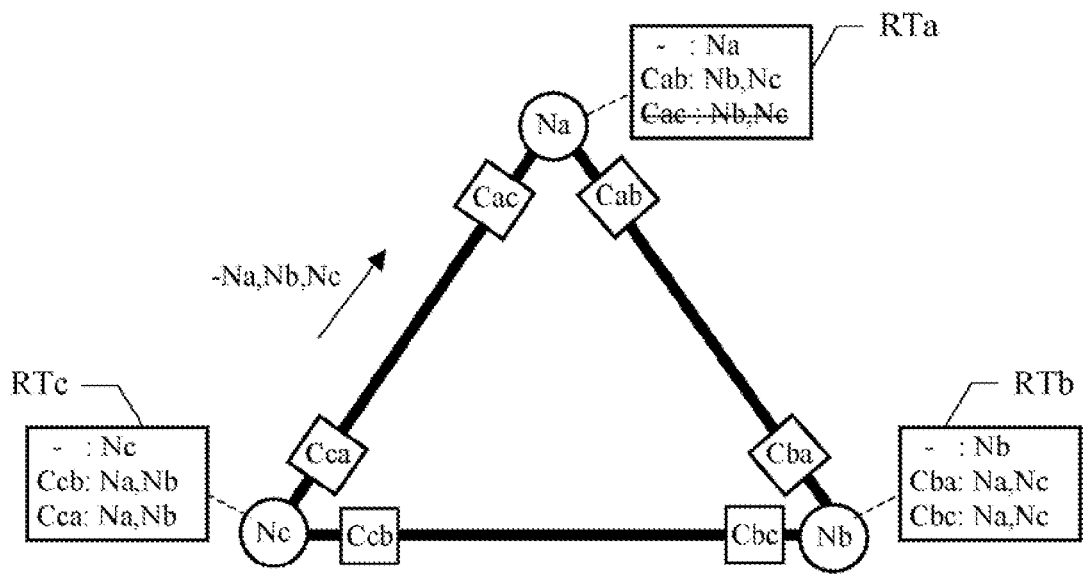
Figure 8C:
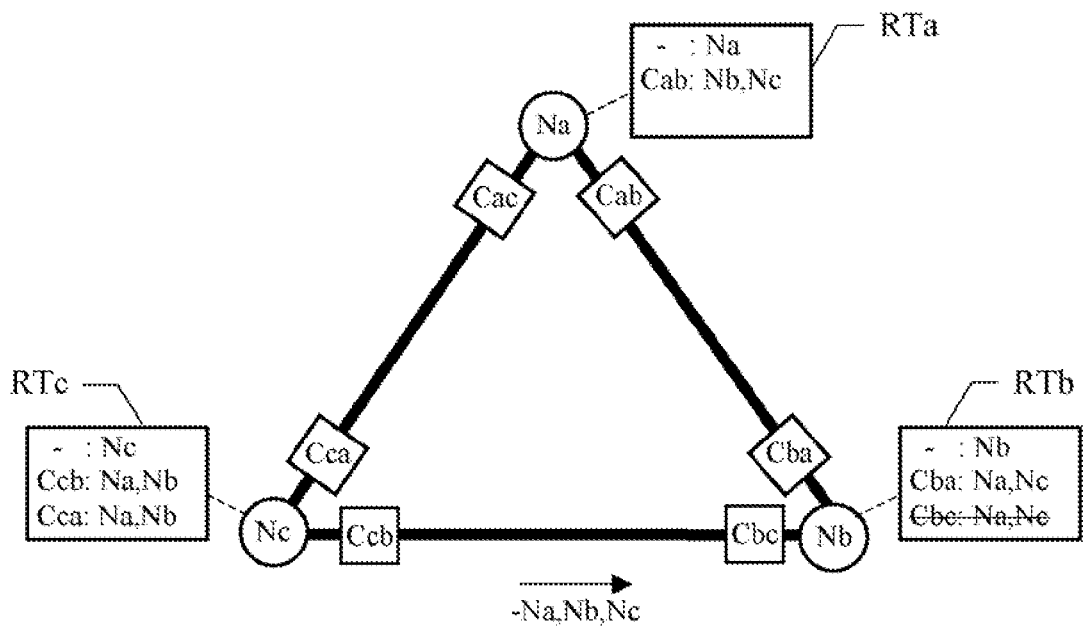
Figure 8D:
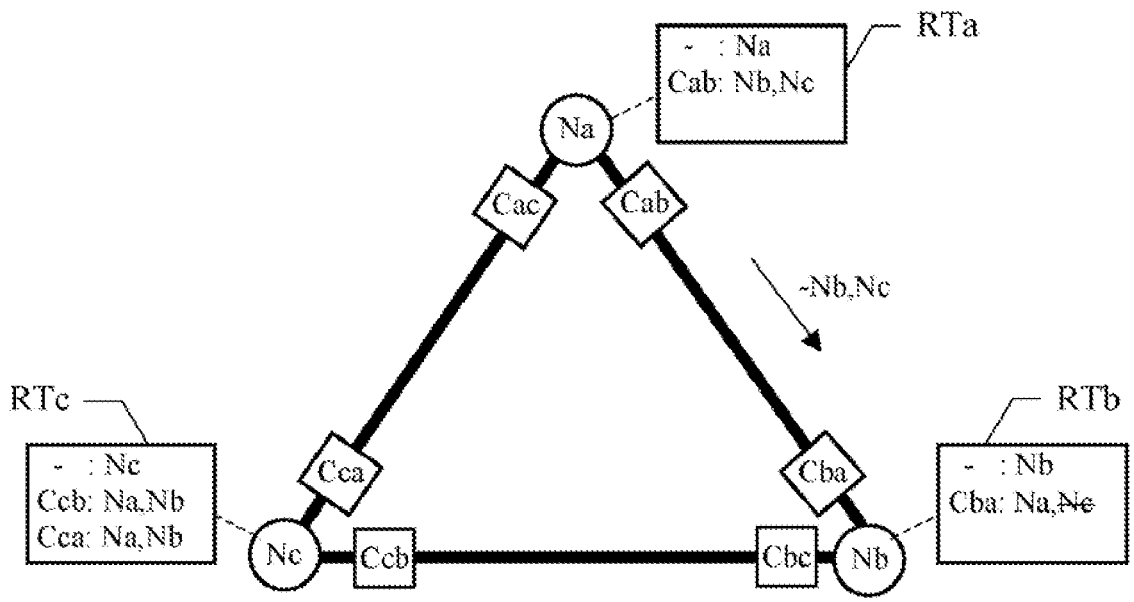
Figure 8E:
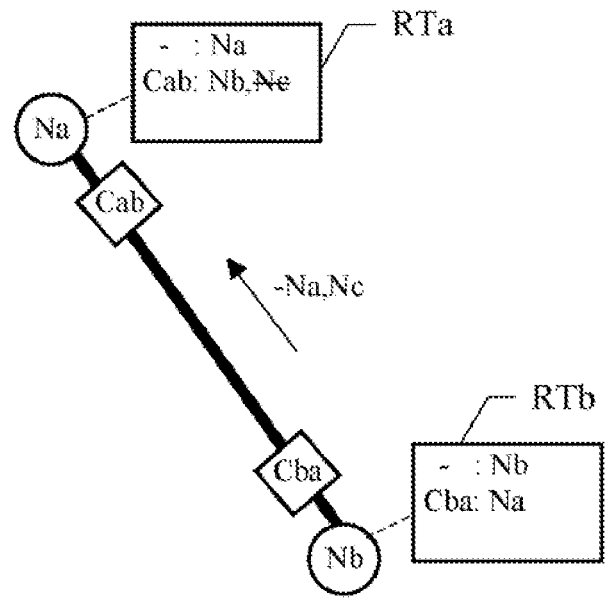

At the end, the shutdown of a selected node in the same (complete) network is illustrated in FIGS. 8a-8e (with the sequence diagram of FIG. 8a that describes the dynamic behavior of the structure by means of a series of messages denoted with progressive sequence numbers preceded by the symbol "T").

For example, let us assume that the administrator decides to shutdown the node Nc. For this purpose, the administrator submits a corresponding command to the Routing Manager RMc (message T1: \Shutdown\). In response thereto, the Routing Manager RMc retrieves all the nodes of its routing table RTc (i.e., Na, Nb and Nc), and submits a corresponding remove command −Na,Nb,Nc to its adjacent nodes; particularly, the remove command −Na,Nb,Nc is submitted to the node Na (message T2: tell(\Na,Nb,Nc\,\REMOVE\) and to the node Nb (message T3: tell(\Na,Nb,Nc\,\REMOVE\).

Moving now to the Routing Manager RMa (see FIG. 8b), in response to the remove command −Na,Nb,Nc from the node Nc the routing table RTa is updated accordingly, by deleting the nodes Nb,Nc from the entry for the corresponding connection Cac (message T4: updateRT( )); as a result, the entry itself associated with the connection Cac is deleted (since no node can be reached through it any longer). The routing table RTa is then propagated to the adjacent nodes different from the node Nc, i.e., to the node Nb (message T5; propagateRT( )); for this purpose, the Routing Manager RMa submits a remove command including the nodes that have been deleted from the routing table RTa, i.e., −Nb,Nc (message T6: tell(\Nb,Nc\REMOVE\)).

With reference instead to the Routing Manager RMb (see FIG. 8c), in response to the remove command −Na,Nb,Nc from the node Nc the routing table RTb is updated by deleting the nodes Na,Nc from the entry associated with the corresponding connection Cbc (message T7: updateRT( )); in this case as well, this results in the deletion of the entry itself associated with the connection Cbc (since no node can be reached through it any longer). The routing table RTb is then propagated to the adjacent nodes different from the node Nc, i.e., to the node Na (message T8: propagateRT( )); for this purpose, the Routing Manager RMb submits a remove command including the nodes that have been deleted from the routing table RTb, i.e., −Na,Nc (message T9: tell(\Na, Nc\REMOVE\)).

At the same time (see FIG. 8d), in response to the remove command −Nb,Nc from the node Na the routing table RTb is updated by removing the node Nc from the entry associated with the corresponding connection Cba (message T10: updateRT( )). The routing table RTb should be now propagated to the adjacent nodes different from the node Na (message T11: propagateRT( )); however, no other adjacent node is available in the routing table RTb, so that the propagation process is stopped.

Returning to the Routing Manager RTa (see FIG. 8e), in response to the remove command −Na,Nc from the node Nb the routing table RTa is updated by removing the node Nc from the entry associated with the corresponding connection Cba (message T12; updateRT( )). The routing table RTa should be now propagated to the adjacent nodes different from the node Nb (message T13: propagateRT( )); however, no other adjacent node is available in the routing table RTa, so that the propagation process ends. At this point, the selected node Nc can be actually shutdown (at the same time dropping the associated connections Cca and Ccb).

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design, choice.

For example, similar considerations apply if the system has a different architecture or includes equivalent nodes. Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like).

Likewise, the proposed solution is also suitable to be used with equivalent communications stacks (for example, based on different multiplexing protocols); in any case, it should be evident that the term routing table must not be interpreted as restricted to any specific implementation thereof (being possible to replace it with any other entity suitable to manage the required information).

Although the use of two different commands for the full update and the add operations is preferable (since it allows forcing the reset of a selected node), this is not to be intended as a limitation. Indeed, in an alternative embodiment of the invention the same result, may also be achieved by means of a single generic add command, in this case, each node receiving the generic add command from an unknown node (i.e., not included in its routing table) performs the full update operation; conversely, each node receiving the same command from a known node performs the above-described add operation.

In any case, the proposed solution lends itself to be implemented with equivalent procedures; for example, it is possible to apply the required changes to the routing table of the node initiating the process directly, or to remove the node to which any command is submitted in its specification.

Nothing prevents supporting only some of the above-described scenarios (for example, the establishment of new connections and the shutdown of the nodes, but not the reset of the nodes and the drop of the connections).

The proposed solution is also suitable to be exploited in systems having other topologies; in any case, the application of the same solution to different applications is not excluded.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any non-transitory computer readable storage medium. A non-transitory computer readable storage medium may be, for example, but not limited to, a semiconductor system, apparatus, or device, or any suitable combination of the foregoing. More specific examples (a non-exhaustive list) of the computer readable storage medium would include the following: an electrical connection having one or more wire, a portable computer diskette, a hard disk, a random access memory (RAM), a read-only memory (ROM), an erasable programmed read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be an tangible medium that can contain, or store a program for use by or in connection with an instruction execution system, apparatus, or device.

Moreover, it is emphasized that the program is suitable to be put on the market as a stand-alone product, in order to be installed on any new node to be added to an existing network.

In any case, the solution according to the present invention lends itself to be carried out with a hardware structure (for example, integrated in a chip of semiconductor material), or with a combination of software and hardware.

What is claimed is:

1. A method for routing information in a network of data processing nodes, wherein each node is adapted to route the information according to a corresponding routing table including an indication of the nodes reachable through each adjacent one of the nodes directly connected thereto, the method including the steps of:
    a first one of the nodes submitting a first request of addition of the nodes in the corresponding routing table to a second one of the adjacent nodes;
    the second node adding the nodes of the first request to the corresponding routing table and submitting a second request to each adjacent node, the second request for the first node relating to the addition of the nodes in the routing table of the second node with the exception of the nodes reachable through the first node, and the second request for each other adjacent node different from the first node relating to the addition of the nodes being added to the routing table of the second node; and
    each receiver one of the nodes receiving the second request from a sender one of the adjacent nodes adding the nodes of the second request to the corresponding routing table and propagating the second request for the addition of the nodes being added to the routing table of the receiver node to each adjacent node different from the sender node, wherein each node is separated from each adjacent node by a firewall, and wherein each pair of adjacent nodes is connected through a point-to-point tunnel crossing the corresponding firewall.

2. The method according to claim 1, further including the step of:
    establishing a new connection between the first node and the second node, the first request being submitted in response to the establishing of the new connection.

3. The method according to claim 1, wherein the first request consists of a first command and the second request consists of a second command different from the first command.

4. The method according to claim 3, further including the step of:
    resetting the first node, the first request being submitted in response to the resetting of the first node.

5. The method according to claim 1, farther including the steps of:
    a third one of the nodes submitting a third request of removal of the nodes in the corresponding routing table to at least one of the adjacent nodes; and
    each further receiver one of the nodes receiving the third request from a further sender one of the adjacent nodes removing the nodes of the third request from the corresponding routing table and propagating the third request for the removal of the nodes being removed from the routing table of the further receiver node to each adjacent node different from the further sender node.

6. The method according to claim 5, further including the steps of:
    starting a drop of a selected connection between the third node and a selected one of the adjacent nodes, the third request being submitted to the selected adjacent node in response to the starting of the drop; and dropping the selected connection.

7. The method according to claim 5, farther including the steps of:

starting a shutdown of the third node, the third request being submitted to each adjacent node in response to the starting of the shutdown; and shutting down the third node.

8. A computer program product for routing information in a network of data processing nodes, wherein each node is adapted to route the information according to a corresponding routing table including an indication of the nodes reachable through each adjacent one of the nodes directly connected thereto, the computer program product comprising a non-transitor computer readable storage medium having computer usable program code tangibly embodied therewith, the computer readable storage medium comprising:

computer usable program code configured to enable a first one of the nodes to submit a first request of addition of the nodes in the corresponding routing table to a second one of the adjacent nodes;

computer usable program code configured to enable the second node to add the nodes of the first request to the corresponding routing table and to submit a second request to each adjacent node, the second request for the first node relating to the addition of the nodes in the routing table of the second node with the exception of the nodes reachable through the first node, and the second request for each other adjacent node different from the first node relating to the addition of the nodes being added to the routing table of the second node; and computer usable program code configured to enable each receiver one of the nodes receiving the second request from a sender one of the adjacent nodes to add the nodes of the second request to the corresponding routing table and to propagate the second request for the addition of the nodes being added to the routing table of the receiver node to each adjacent node different from the sender node, wherein each node is to be separated from each adjacent node by a firewall, and wherein each pair of adjacent nodes is to be connected through a point-to-point tunnel crossing the corresponding firewall.

9. A computer program product for routing information in a network of data processing nodes, the computer program product comprising a non-transitory computer readable storage medium having computer usable program code tangibly embodied therewith, the computer readable storage medium comprising:

computer usable program code configured to receive, at a second node, a first request from a first node;

computer usable program code configured to add nodes identified in the first request to a routing table corresponding to the second node;

computer usable program code configured to submit a second request to one or more adjacent nodes in response to the first request, the second request relating to an addition of nodes in the routing table except for nodes reachable through the first node, and the second request instructing the adjacent nodes to propagate the second request to other adjacent nodes in the network, wherein the first and second requests are to be transferred through point-to-point tunnels crossing corresponding firewalls and the nodes in the network have a non-hierarchical relationship.

10. The computer program product of claim 9, wherein the computer readable storage medium further includes:

computer usable program code to receive a third request of removal of nodes in the routing table; and computer usable program code to remove nodes identified in the third request from the routing table and propagate the third request to other adjacent nodes in the network different from a sender node.

11. The computer program product of claim 10, wherein the third request is to correspond to a shutdown of the third node.

12. The computer program product of claim 10, wherein the third request is to correspond to a dropping of a connection between the second node and the third node.

* * * * *